United States Patent
Bassett et al.

(10) Patent No.: US 7,248,872 B2
(45) Date of Patent: *Jul. 24, 2007

(54) METHOD, SYSTEM, AND PROGRAM FOR PROVIDING INFORMATION ON USERS OF WIRELESS DEVICES IN A DATABASE TO A PERSONAL INFORMATION MANAGER

(75) Inventors: Ronald W. Bassett, Pflugerville, TX (US); Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

This patent is subject to a terminal disclaimer.

(21) Appl. No.: 10/042,046

(22) Filed: Jan. 8, 2002

(65) Prior Publication Data

US 2003/0131023 A1    Jul. 10, 2003

(51) Int. Cl.
*H04Q 7/20*    (2006.01)
(52) U.S. Cl. ............... 455/433; 455/414.2; 455/556.2
(58) Field of Classification Search .................... None
See application file for complete search history.

(56) References Cited

U.S. PATENT DOCUMENTS

| | | |
|---|---|---|
| 5,124,912 A | 6/1992 | Hotaling et al. |
| 5,416,473 A | 5/1995 | Dulaney, III et al. |
| 5,428,784 A | 6/1995 | Cahill, Jr. |
| 5,664,063 A | 9/1997 | Johnson et al. |
| 5,664,175 A | 9/1997 | Jackson et al. |
| 5,774,873 A | 6/1998 | Berent et al. |
| 5,790,974 A | 8/1998 | Tognazzini |
| 5,832,489 A | 11/1998 | Kucala |

(Continued)

FOREIGN PATENT DOCUMENTS

EP    0495622    1/1992

(Continued)

OTHER PUBLICATIONS

Patent Cooperation Treaty (PCT) International Search Report, Jan. 29, 2003, for International Application No. PCT/GB02/02020.

(Continued)

*Primary Examiner*—Temica Beamer
(74) *Attorney, Agent, or Firm*—David W. Victor; Konrad Raynes & Victor LLP

(57) ABSTRACT

Provided is a method, system, and program for providing information on users of wireless devices in a database to a personal information manager of one user wireless device. Records are maintained for users of wireless devices within the database. For at least one shadowed user, a list of others users tracking the shadowed user is maintained in the database. A determination is made, for each shadowed user, whether a modification was made to one database record for the shadowed user. For each user on the list of each shadowed user, information is transmitted to the wireless device of the user on the list indicating the shadowed user and the determined modification made with respect to the database record of the shadowed user. The transmitted information is displayed at the wireless device receiving the transmitted information.

49 Claims, 23 Drawing Sheets

U.S. PATENT DOCUMENTS

| | | | |
|---|---|---|---|
| 5,835,896 | A | 11/1998 | Fisher et al. |
| 5,890,138 | A | 3/1999 | Godin et al. |
| 5,918,158 | A | 6/1999 | LaPorta et al. |
| 6,047,260 | A | 4/2000 | Levinson |
| 6,064,975 | A | 5/2000 | Moon et al. |
| 6,085,166 | A | 7/2000 | Beckhardt et al. |
| 6,101,480 | A | 8/2000 | Conmy et al. |
| 6,154,172 | A | 11/2000 | Piccionelli et al. |
| 6,262,732 | B1 | 7/2001 | Coleman et al. |
| 6,369,840 | B1 | 4/2002 | Barnett et al. |
| 6,785,868 | B1 * | 8/2004 | Raff ........................... 715/530 |
| 2003/0131059 | A1 * | 7/2003 | Brown et al. ............... 709/206 |

FOREIGN PATENT DOCUMENTS

| | | |
|---|---|---|
| EP | 0637807 | 7/1994 |
| EP | 0834840 | 9/1997 |
| EP | 1039397 | 9/2000 |
| WO | WO00/29979 | 5/2000 |

OTHER PUBLICATIONS

Beadle, H.W., et al. *"Using Location and Environment Awareness in Mobile Communications."* International Conference on Information, Communications and Signal Processing. ICICS. Singapore Sep. 9-12, 1997, pp. 1781-1785. New York, NY, USA, IEEE.

Manandhar, Sanjay. *"Activity Server: You Can Run but You Can't Hide."* Proceedings of the Summer Usenix Conference Proceedings, pp. 299-311, Jun. 10-14, 1991, Nashville, TN, US (1991) Berkeley, CA, US.

Want, R. et al. *"The Active Badge Location System."* ACM Transactions on Information Systems 10 (1992), pp. 91-102, Jan., No. 1, New York, US.

Hancock, Bill. *"Wireless Big Brother."* Computers and Security. International Journal Devoted to the Study of Technical and Financial Aspects of Computer Security, Elsevier Science Publishers, vol. 19, No. 8, Dec. 1, 2000, pp. 667-668. Amsterdam, NL.

Rhodes, Bradley J. *"The Wearable Remembrance Agent: a System for Augmented Memory."* Wearable Computers, 1997. Digest of Papers. First International Symposium on Cambridge, MA, USA, pp. 123-128.

U.S. Appl. No. 09/848,176, filed on May 3, 2001, entitled "Method, System and Program for Mining Data in a Personal Information Manager Database," invented by MW Brown; R. Dutta and MA Paollini.

U.S. Appl. No. 09/970,874, filed on Oct. 4, 2001, entitled "Method, System and Program for Providing Personal Preference Information when Scheduling Events," by MW Brown; R Dutta and MA Paolini.

Mueller, Erik T., "A Calendar with Common Sense", © 2000 ACM, pp. 198-201.

Schwartz, Ephraim, "Cellular Phone Giants to Integrate Sirf's GPS Technology", Aug. 10, 1998 [online], Retrieved from the Internet <URL: www.infoworld.com./cgi-bin/displayStory.pl?980810.ehe911.htm>.

"allNetDevices:—The Wireless Internet: Applications, Technology and Market Strategies", Jan. 10, 2001, pp. 1-4 [online]. Retrieved from the Internet<URL: www.allnetdevices.com/icom_cgi/print/print.cgi?url=http://www.allnetdevices.com/wireless/opinions/2001...>.

"allNet Devices:—Java 2 Micro Edition and the Mobile Information Device Profile", Feb. 16, 2001, pp. 1-7 [online]. Retrieved from the internet <URL: www.allnetdevices.com/icom_cgi/print/print.cgi?url=http://www.allnetdevices.com/developer/tutorials/2001...>.

Software Patent Institute Database of Software Technologies, Record Display, Record 4, Serial No. TDB1192.0038. Retrieved from the Internet <URL: http://m.spi.org/cgi-bin/newqry?ISA=Hit . . . 000&rec=4&submit=seeit&csum=17256401631>.

Software Patent Institute Database of Software Technologies, Record Display, Record 6, Serial No. TDB1192.0045. Retrieved from the Internet <URL: http://m.spi.org/cgi-bin/newqry?ISA=Hit . . . 000&rec=4&submit=seeit&csum=17950330939>.

"allNetDevices:—Wearable Transmeta Device Planned", Nov. 14, 2000 [online]. Retrieved from the Internet <URL: www.allnetdevices.com/icom_cgi/print/print.cgi?url=http://www.allnetdevices.com/wireless/news/2001...>.

"allNetDevices:—Any Content, Any Device, Anyplace", Feb. 16, 2001 [online]. Retrieved from the Internet <URL: www.allnetdevices.com/icom_cgi/print/print.cgi?url=http://www.allnetdevices.com/wireless/news/2001...>.

U.S. Appl. No. 10/042,049, filed on Jan. 8, 2002, entitled, "Method, System, and Program for Providing Information on Scheduled Events to Wireless Devices", invented by MW Brown; R Dutta; and MA Paolini.

U.S. Appl. No. 09/970,870, filed on Oct. 4, 2001, entitled, "Method, System, and Program for Providing Personal Preference Information when Scheduling Events", invented by MW Brown; R Dutta; and MA Paolini.

U.S. Appl. No. 09/965,007, filed on Sep. 27, 2001, entitled, "Method, System, and Program for Providing Information on Proximate Events", invented by MW Brown; R Dutta; and MA Paolini.

U.S. Appl. No. 09/895,244, filed on Jun. 29, 2001, entitled, "Method, System, and Program for Implementing an Auction Using Calendar Information", invented by MW Brown; R Dutta; and MA Paolini.

U.S. Appl. No. 09/888,471, filed on Jun. 25, 2001, entitled, "Method, System, and Program for Accessing Calendar Information for Shadowed Users from a Database", invented by RW Bassett; MW Brown; R Dutta; and MA Paolini.

U.S. Appl. No. 09/848,176, filed on Jun. 25, 2001, entitled, "Method, System, and Program for Mining Data in a Personal Information Manager Database", invented by MW Brown; R Dutta; and MA Paolini.

U.S. Appl. No. 09/848,173, filed on May 3, 2001, entitled, "Method, System, and Program for Providing User Location Information for a Personal Information Management System from Transmitting Devices", invented by MW Brown; R Dutta; and MA Paolini.

U.S. Appl. No. 09/848,166, filed on May 3, 2001, entitled, "Method, System, and Program for Providing User Location Information with a Personal Information Management Program", invented by MW Brown; R Dutta; and MA Paolini.

* cited by examiner

Scheduled Event Record

Measured Position Record

Location Record

Filtered Position Record

FIG. 8

| Calendar | February 5, 2001 | | |
|---|---|---|---|
| Monday, February 5th 400 402 | | | |
| Time | Scheduled Event | Actual Activity | |
| 8:00 AM | Arrive at Work | At Home | |
| 9:00 | Work at desk | In office | |
| 10:00 | | | |
| 11:00 | | | |
| 12:00 | Lunch at Dennys | In office | |
| 1:00 | Meeting w/ office team | In meeting room | |
| 2:00 | | In office | |
| 3:00 | | In office | |
| 4:00 | | In office | |
| 5:00 | Family Dinner | In office | |

406

October 2001
| S | M | T | W | T | F | S |
|---|---|---|---|---|---|---|
| | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | | | |

March 2001
| S | M | T | W | T | F | S |
|---|---|---|---|---|---|---|
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

FIG. 9a

|   | October 2001 |   |   |   |   |   |
|---|---|---|---|---|---|---|
| S | M | T | W | T | F | S |
|   | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |   |   |   |

FIG. 9b

Mon., Feb. 5th

| Time | Scheduled | Actual |
|---|---|---|
| 8:00 AM | Arrive at Work | At Home |
| 9:00 | Work at desk | In office |
| 10:00 |   |   |

More ↓

Shadowed Scheduled Event Record

Shadowed User Entry

FIG. 26
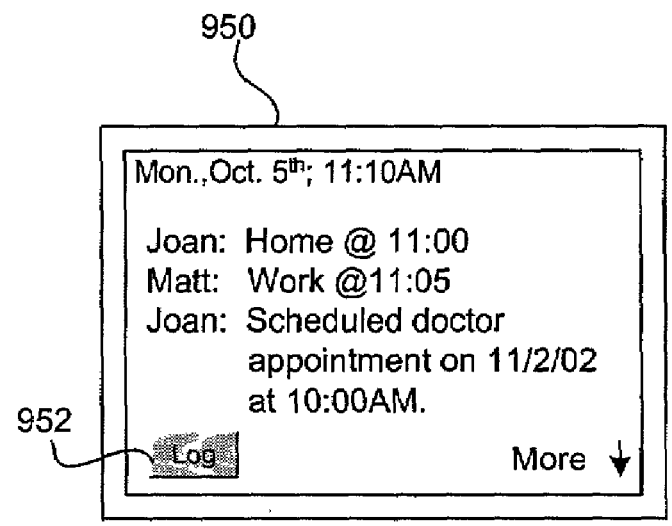
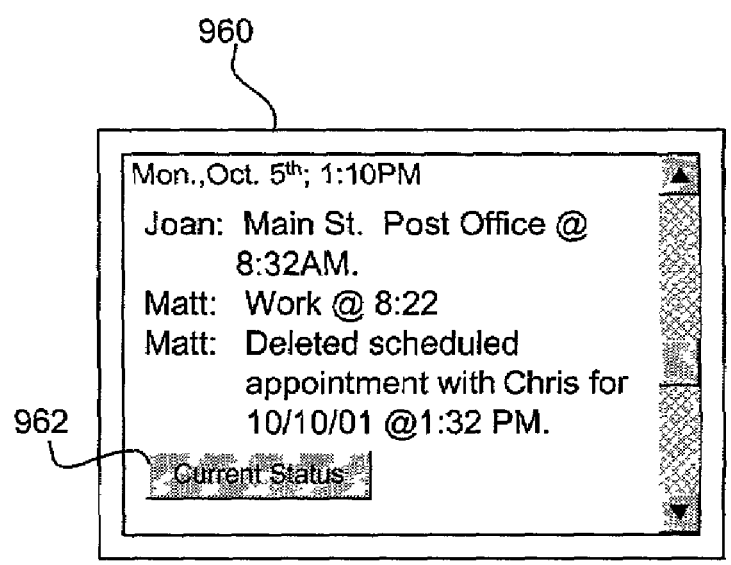

METHOD, SYSTEM, AND PROGRAM FOR PROVIDING INFORMATION ON USERS OF WIRELESS DEVICES IN A DATABASE TO A PERSONAL INFORMATION MANAGER

BACKGROUND OF THE INVENTION

1. Field of the Invention

The present invention relates to a method, system, and program for providing information on users of wireless devices in a database to a personal information manager.

2. Description of the Related Art

Portable computing devices, such as hand held computers, cellular phones, palm devices, etc., have become increasingly popular in recent years. The technology has advanced to such a degree that now people can access the Internet through wireless technology, such as a cellular phone or personal digital assistant (PDA), and review content especially tailored for a small portable device. The term PDA, as used herein, refers to any wireless, portable, and small hand held computer device, such as a palm computer, cellular phone, wearable computers, etc. Some of the most popular mobile applications for such wireless devices have included personal information managers (PIMs), entertainment programs, financial services, and mobile commerce.

One of the recent technological developments for mobile Internet access is the Wireless Application Protocol (WAP), which allows mobile devices to use data services and access the Internet. WAP provides a client/server architecture. A WAP enabled client, such as a cell phone or palm computer, can use micro browsers which are designed to operate within the small display screen of mobile devices and use less memory than a desktop browser. Content for mobile WAP enabled devices may be written in the Wireless Markup Language (WML), which provides a tagged mark-up language similar to the Hypertext Markup Language (HTML), but designed specifically to function in a small-screen environment. Many content providers are providing WAP pages to enable access to the large base of mobile phone and PDA users.

Notwithstanding, recent developments in wireless computing, such as more advanced PIMs, Internet browsing and e-commerce features, only provide users with a significantly limited version of the programs and functions that are available at a desktop computer. For instance, a desktop PIM or calendar program provides a substantially more robust display presentation and range of program functionality than is available for mobile wireless device PIM applications. The same is true for Internet browsing. Given the substantial advantages of desktop PIM and Internet access programs over those available for mobile devices, most computer users, except the submarket of frequent business travelers, may not be motivated to purchase wireless devices for uses other than as a mobile telephone and limited PIM, e.g., address book, calendar, to do list, etc.

Thus, there is a need in the art for an application that would more fully exploit wireless computing technology to extend the utility beyond that of a portable telephone and limited PIM.

SUMMARY OF THE PREFERRED EMBODIMENTS

Provided is a method, system, and program for providing information on users of wireless devices in a database to a personal information manager of one user wireless device. Records are maintained for users of wireless devices within the database. For at least one shadowed user, a list of others users tracking the shadowed user is maintained in the database. A determination is made, for each shadowed user, whether a modification was made to one database record for the shadowed user. For each user on the list of each shadowed user, information is transmitted to the wireless device of the user on the list indicating the shadowed user and the determined modification made with respect to the database record of the shadowed user. The transmitted information is displayed at the wireless device receiving the transmitted information.

In further implementations, determining whether one database record for the shadowed user was modified further comprises determining whether one scheduled event record for the shadowed user was modified. The transmitted information further indicates modifications made to the scheduled event record of the shadowed user.

In still further implementations, position records are generated indicating a geographical location of wireless devices associated with users of the database and a time the geographical location was determined. In such case, determining whether one database record for the shadowed user was modified further comprises determining whether a new position record was generated indicating a geographical location and time the geographical location was determined for the wireless device associated with the shadowed user. The transmitted information further indicates the geographical location and time in the new position record.

Further provided is a method, system, and program for rendering information transmitted from a database in a remote server in a personal information manager executing in a wireless device. Records are maintained in the database for users of wireless devices. Information transmitted from the remote server is received indicating a modification to one of the database records for one shadowed user of one other wireless device. A message window is displayed on the wireless device in response to receiving the transmitted information. The received information is rendered in the message window. A calendar view is rendered at the wireless device to display calendar information maintained for the user of the wireless device in the database, wherein the calendar view displays information on the shadowed user.

In further implementations, information transmitted from the remote server indicating modifications to database records for additional shadowed users is received and the received information for multiple shadowed users is rendered in the message window.

The described implementations provide techniques for providing information on changes to a shadowed user's database records to a user of a wireless device tracking the shadowed user. The information on modifications to database records of shadowed users provided to the tracking users may include information on scheduled event records of the shadowed users that are modified and information on a position of a wireless device associated with the shadowed user. In this way, the user tracking the shadowed user may use a personal information manager (PIM) to obtain immediate feedback on changes to the status of shadowed users.

BRIEF DESCRIPTION OF THE DRAWINGS

Referring now to the drawings in which like reference numbers represents corresponding parts throughout:

FIGS. 8, 9a, and 9b illustrate examples of a display of user calendar and generated location information in accordance with implementations of the present invention.

FIG. 26 illustrates an example of the display of information from shadowed user entries in accordance with implementations of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
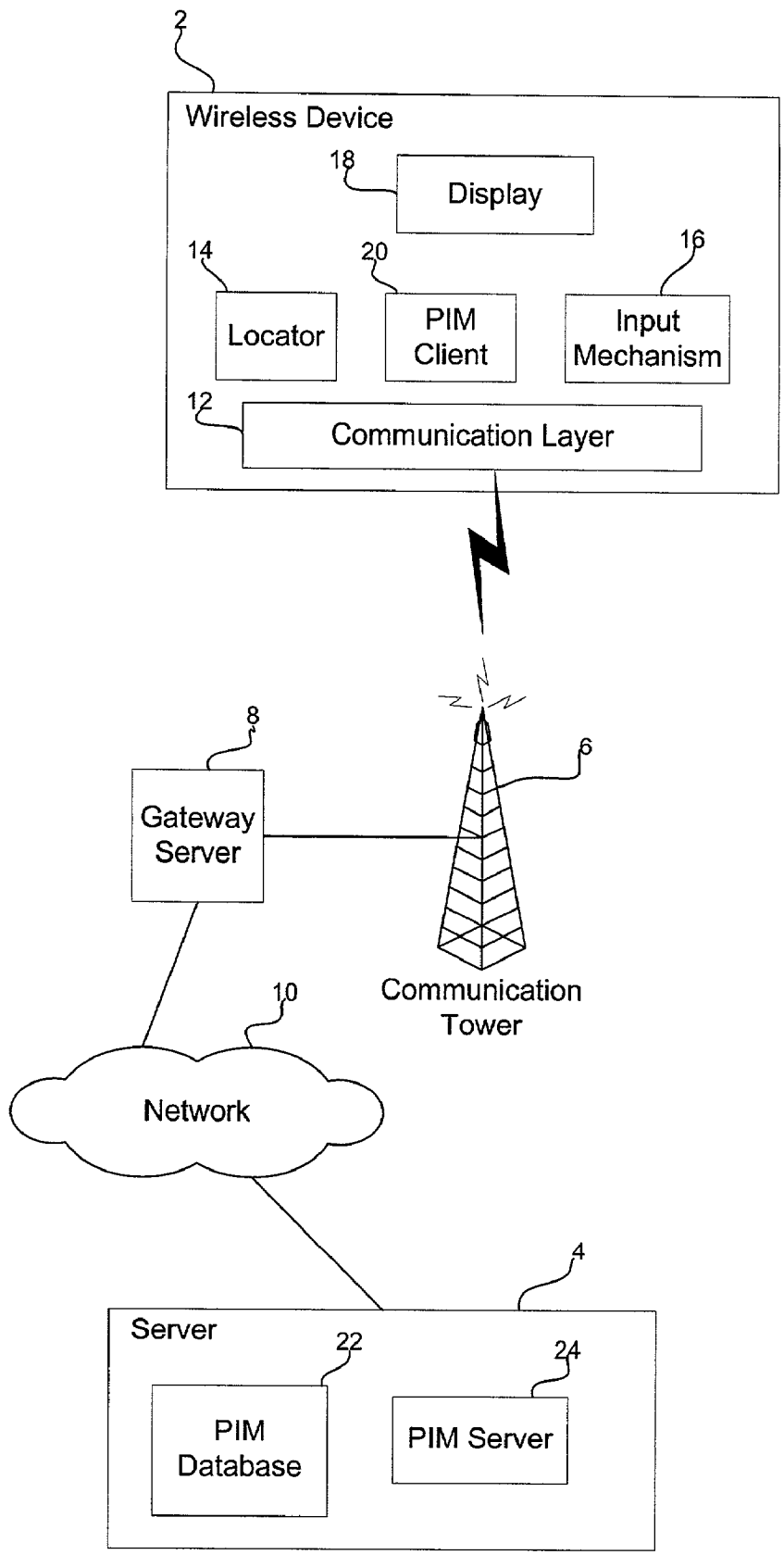
FIG. 1 illustrates a telecommunication environment in which aspects of the invention are implemented.

FIG. 1 illustrates a wireless computing environment in which embodiments of the invention are implemented. A wireless device 2, such as a telephony device, e.g., cellular phone, personal digital assistant (PDA), hand held computer, palm computer, etc., communicates with a server 4 via a communication tower 6, gateway server 8, and network 10. The server 4 may comprise one or more server class machines known in the art. The wireless device 2 includes a communication layer 12 which converts digital data into a signal that is transmitted to the communication tower 6 in a manner known in the art. The gateway server 8 converts the signals back into digital data to transmit via network 10 to the server 4. The network 10 may comprise any collection of devices, routers, etc. used to transmit data to a centralized server 4 providing data management for the wireless device 2 operations. The communication tower 6 and communication layer 12 may implement any known wireless transmission technology known in the art, such as 3G, Code-Division Multiple Access (CDMA), Global System for Mobile Communications (GSM), satellite, Bluetooth, etc.**

**Bluetooth is a trademark of Telefonaktiebolaget LM Ericsson; Sametime and Lotus are trademarks of Lotus Development Corp. and/or International Business Machines, Corp.

The wireless device 2 further includes locator technology 14 that provides a current position coordinate of the wireless device 2 in three dimensional space (x, y, z) on the surface of the earth and the time the position coordinate was generated. The locator 14 may comprise a global position satellite (GPS) receiver that is capable of calculating a current position based upon signals sent from satellites in a manner known in the art. Alternatively, the location of the wireless device 2 can be estimated externally from the wireless device by measuring the transmissions from the wireless device 2 using any known location positioning technology in a manner known in the art, such as Enhanced Observed Time Differential (E-OTD), Time Of Arrival (TOA), the CellPoint positioning system, the Ericsson Mobile Positioning System, etc.** In fact the United States Federal Communication Commission (FCC) mandated that cellular phone manufacturers incorporate technology to allow the location of the wireless device 2 to be determined. Any reference to the locator 14 refers to the locator technology used within the wireless device 2 that enables a position determination. For instance, if the locator 14 comprises a GPS receiver, then the locator 14 itself may determine the actual position coordinate. Alternatively, the locator 14 may provide information to an external component to enable the external component to determine the position coordinate of the wireless device 2.

**Bluetooth is a trademark of Telefonaktiebolaget LM Ericsson; Sametime and Lotus are trademarks of Lotus Development Corp. and/or International Business Machines, Corp.

The wireless device 2 further includes an input mechanism 16 for entering any type of data, including text, voice data, audio, images, movies, etc. The input mechanism 16 may include any known data input system known in the art, including a keyboard embedded in the device 2 with depressable keys, a touch sensitive displayed keyboard, a microphone for providing audio input, voice recognition software, still image camera, video recorder, pen-stylus text input system including handwriting recognition software, etc. Data entered by the user through the input mechanism 16 or downloaded from the server 4 can be rendered in display 18, which may comprise any electronic display device known in the art. A Personal Information Manager (PIM) client 20 gathers and presents PIM information, such as calendering and scheduling information, in accordance with the described implementations. The term "PIM" as used herein refers to a program designed to allow users to organize random bits of information in a useful format. The PIM program may enable calendar or scheduler operations. A calendar program enables one or more users to record and organize events and appointments. A scheduler program enables a group of colleagues to schedule meetings and other appointments, and share schedule and calendar information. Further, the PIM may be intended for use by a single individual for personal information or for use by a company or organization to provide information related to that persons involvement with the company or organization. The use of the term PIM or PIM program herein refers to any program that includes some or all of the above described calendar or scheduler functions, or any other functions those skilled in the art associate with PIMs.

The server 4 includes a PIM database 22 maintaining user PIM information and a PIM server 24 for gathering and filtering data from wireless devices 2 for the users of the system. The PIM database 22 may be implemented using any database technology known in the art, e.g., relational database, object oriented database, etc. Although FIG. 1 only shows one wireless devices 2, the server 4 and PIM database 22 may maintain data for multiple wireless devices 2 and users.

In the described implementations, the PIM client 20 gathers position coordinates for the PIM server 24. The PIM server 24 then uses the position coordinates to supplement the user calendar records with information on what the user actually did for time periods within a day. The user could then view this enhanced calender including listings of scheduled appointments as well as information describing the actual location and activities of the user and descriptions thereof. The term "location" and "geographic location" as used herein refer to any location that may be mapped and ascertained. Such location or geographic location may be any location on the surface of the earth or the earth's atmosphere, or outer space, that can be expressed as a position coordinate in space. The term "location" or "geographic location" may refer to a specific position coordinate in space, e.g., an X, Y, Z coordinate, or a boundary or area of coordinates. Additionally, the location may be expressed as a vector. The term "position coordinate" as used herein refers to any of a set of numbers used in specifying the location of a point in space, or any one of a set of variables used in specifying the state or motion of an entity, such as a wireless unit or person, associated with the position coordinate.

The PIM server 24 includes the program logic that responds to data requests from PIM clients 20, accesses the PIM database 22 to perform database operations, and performs other data management operations related to managing the PIM database 22. The PIM server 24 may include a database management system (DBMS) known in the art or include an interface to access a DBMS program in a manner known in the art to perform operations with respect to the PIM database 22. The PIM server 24 may implement any database programming techniques for performing operations in the PIM database 22. For instance, the PIM server 24 may implement separate application programs for performing database operations or implement database stored procedures to perform database operations. The PIM client 20 includes those program components that gather coordinate and location information as described herein, communicates with the PIM server 24, and renders calendaring information at the wireless device 2.

Figure 2:
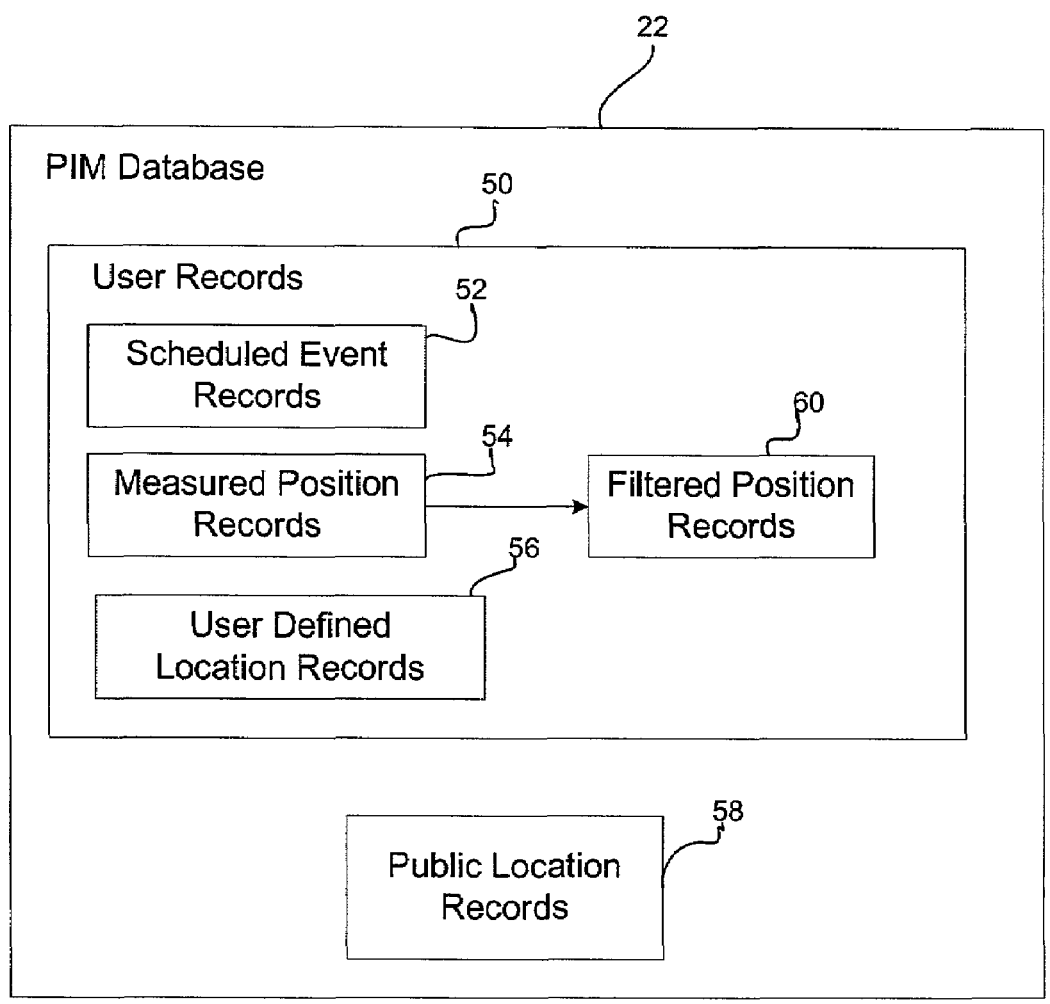
FIG. 2 illustrates components of a PIM database in accordance with implementations of the present invention.

FIG. 2 illustrates the data components of the PIM database 22 maintained by the server 4. The PIM database 22 includes a plurality of user records 50 for each user of a wireless device 2 participating in the wireless computing environment described herein. Each user record 50 includes one or more user scheduled event records 52, measured position records 54, and location records 56 and 58. From the measured position records 54, the PIM server 24 generates filtered position records 60 that provide information on user geographic location and activity for time periods, such as information for a period of fifteen minutes, twenty minutes, one hour, etc.

Figure 3A:
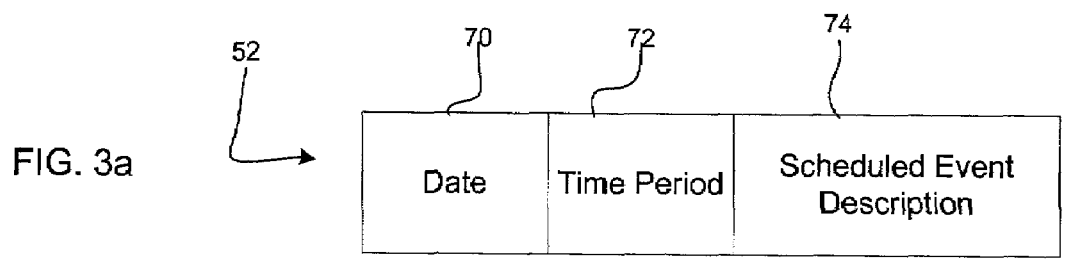
FIGS. 3a, b, c, d illustrate data structures used in accordance with implementations of the present invention.

FIG. 3a illustrates fields in a user scheduled event record 52, including a date 70, time period 72 indicating a time range of the event, and a scheduled event description 74 providing information on the nature of the scheduled event. Through the client PIM 20 software, a user could use the input mechanism 16 to schedule a calendar event and create a scheduled event record 52. Additionally, the user could enter scheduled events from a desktop computer (not shown) that communicates with the server 4 via a network such as the Internet. The scheduled events may be shown in a calendar rendered on the display 18. Additionally, the scheduled events may be shown in a calendar rendered on another computer capable of accessing the server user records 50 in the server 4, such as a desktop computer communicating with the server 4 over the Internet.

Figure 3B:
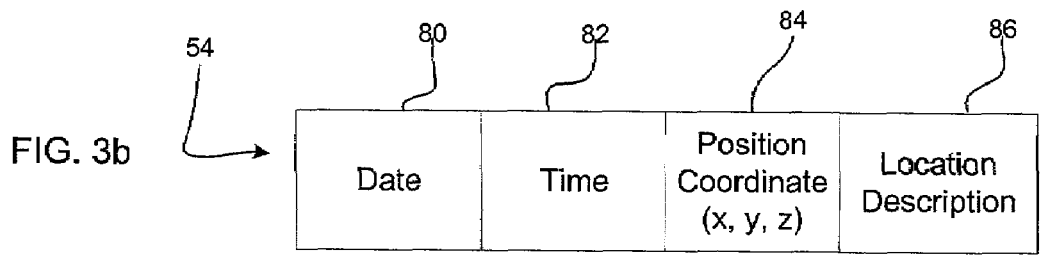

FIG. 3b illustrates fields in a measured positioned record 54 for a user, including a date 80 and time 82 the position was measured, a position coordinate 84 expressed as a unique three dimensional x, y, z geographic coordinate on the surface of the earth, and a location description 86 providing descriptive information on the location. In the described implementations, the PIM client 20 periodically generates a measured position record 54 by obtaining the measured position coordinate (x, y, z) and the current time from the locator 14 (which may, in certain implementation interact with external components to provide the location and position coordinate). The location description 86 may be obtained locally at the wireless device 2 or determined subsequently by the server 4 as described in the following implementations.

Figure 3C:
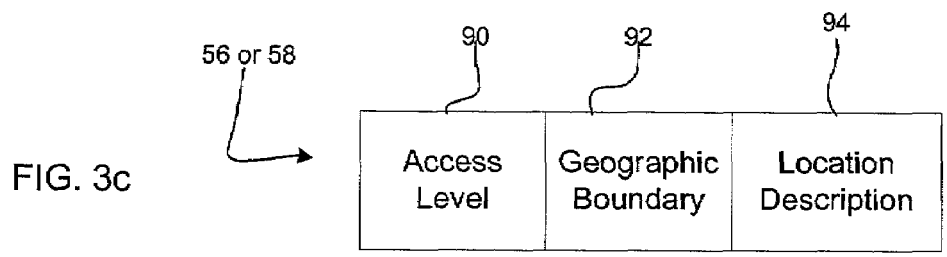

FIG. 3c illustrates the fields maintained in the user defined 56 and public 58 location records. An access level field 90 indicates which users can be allowed to use the location record 56 or 58 to determine information about a location. The public location record 58 has public level access such that the PIM server 24 can consider a public location record 58 for any user in the PIM database 22. A user location record 56 can only be considered for the particular user that defined the location record 58 and any other authorized users in the system, as indicated by the access level 90. A geographic boundary field 92 defines a boundary of a defined region in three dimensional space. A location description field 94 provides a description of the location, which may include text, images, sound, movies, etc. A company maintaining the server 4, such as a telecommunication service provider, can use satellite maps and other information to determine the geographic boundaries in three dimensional space of various buildings and businesses. Business could register their geographic boundaries. Public location records 58 may then be generated for each of these determined geographic boundaries and include a description of the location within the geographic boundary.

The user specified location records 56 are generated by the user to provide information to include with the user's calendar. For instance, the user may obtain from a third party, such as a mapping company or organization, the geographic boundaries of an office or building and provide geographic boundary and location description information to the server 4 to include in a user location record 56. In another implementation, the user can activate a geographic boundary definition mode on the wireless device 2 to record position coordinates of a geographic boundary using the locator 14. In this geographic boundary definition mode, the user may walk or otherwise travel around a geographic area. While moving through the geographic area, the wireless device 2 would determine the x, y, z position coordinates at frequent intervals using the locator 14. The PIM client 20 or PIM server 24 can then use the determined position coordinates to determine a geographic boundary bounding all of the coordinates generated in the geographic boundary definition mode. This determined geographic boundary would then be included in the geographic boundary field 92 of the eventual user defined location record 56 stored in the user records 50 in the database 22. The user may further use the input mechanism 16 to enter information to include in the location description field 94 and the access level 90. The user access level 90 may specify that the user location record 68 be accessible to the user and other specified users, thereby limiting access of the location record 56 to a user defined group.

Figure 3D:
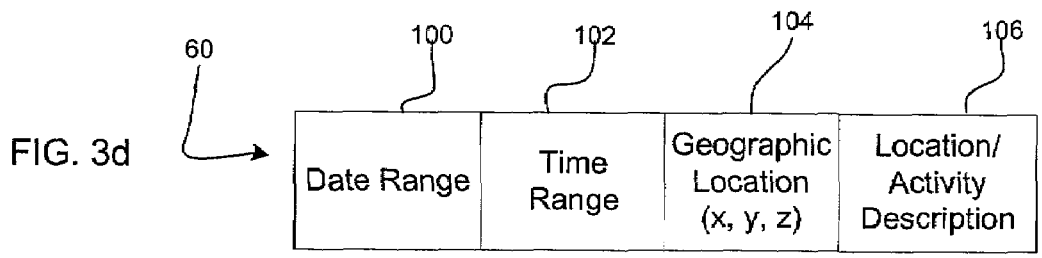

FIG. 3d illustrates a filtered position record 60 generated from a range of consecutive position records 54 having a same location description 86. The date range 100 and time range 102 for the generated filtered position record 60 would comprise the first and last dates 80 and times 82 of the consecutive position records 64 having the same location description 86. In this way, a single filtered position record 60 represents the data in multiple consecutive position records 54 having a same location description 106. Alternatively, a filtered position record 60 can consolidate multiple position records 54 that have position coordinates 84 within a predetermined proximity, without consideration of the location description 86. A geographic location field 104 indicates the common geographic location of the position records 60 having the same location description 86, which could include the geographic boundary from a location record 56 or 58 if the location description 86 of the consolidated position records 60 was determined from a location record 56 or 58.

Additionally, if algorithms in the PIM server 24 determine that a range of measured position records 54 define an activity, e.g., driving, walking, flying in an airplane, etc., then a filtered position record 60 would be generated for those position records 54 defining the activity. The date range 100 and time range 102 for the generated filtered position record 60 would comprise the first and last date 80 and time 82 of the consecutive position records 64 defining an activity and the location/activity description 106 field for this filtered position record 60 would include a description of the determined activity.

Figure 4:
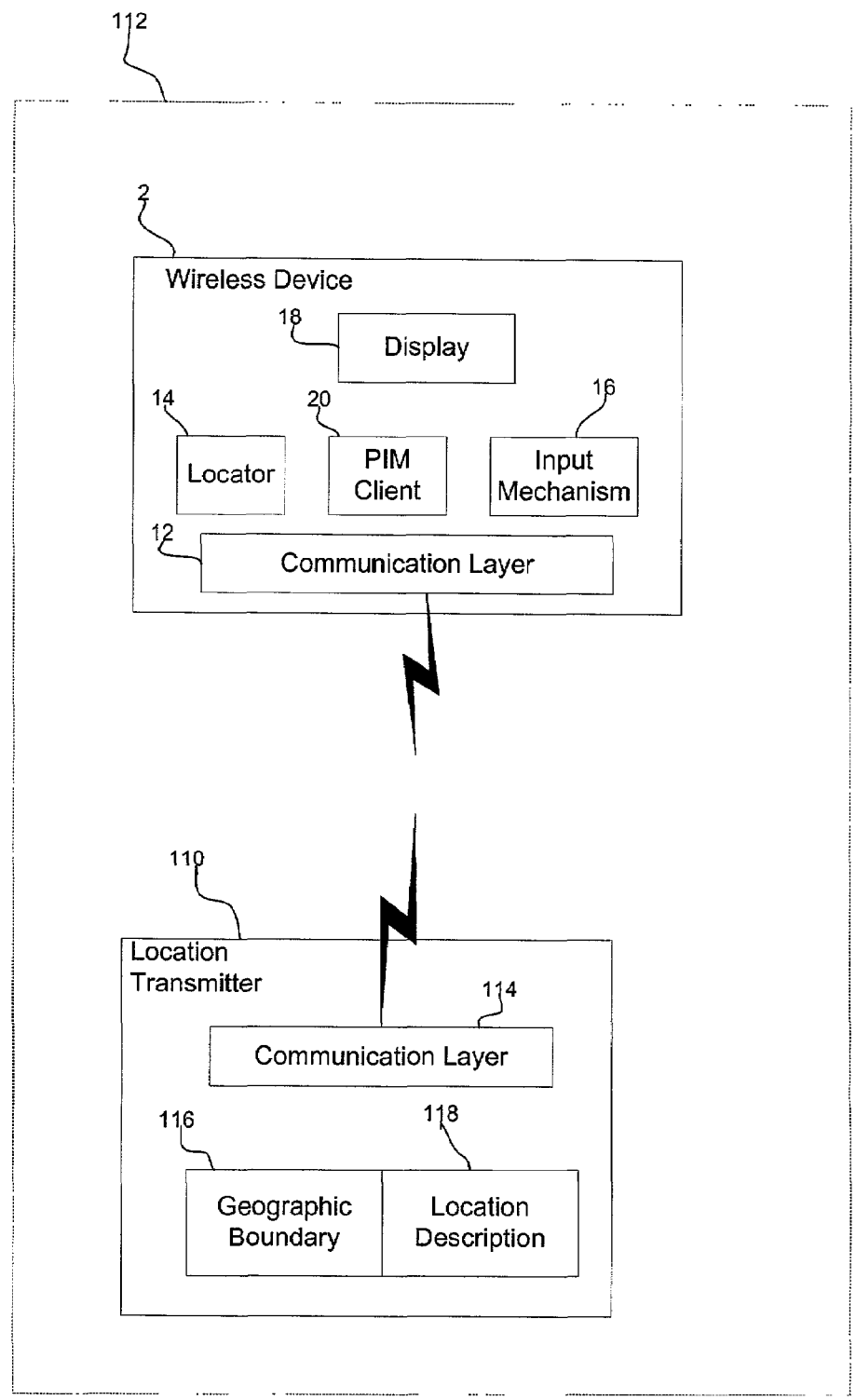
FIG. 4 illustrates further details of the telecommunication environment in which aspects of the invention are implemented.

FIG. 4 illustrates an additional implementation of the telecommunication environment for obtaining geographic boundary information. A location transmitter 110 is maintained in a geographic location or boundary 112, such as an office, building, designated region, etc., and includes a communication layer 114 to transmit data throughout the geographic location 112. For larger geographic locations, multiple location transmitters 110 may be deployed to transmit throughout the entire geographic location 112. The location transmitter 110 maintains a geographical boundary 116, defining a region of x, y, z coordinates, and a location description 118 providing descriptive information on the geographic boundary 112. The local transmitter 110 is capable of transmitting the geographic boundary 116 and location description 118 through the communication layer 114 to any receiving device within the geographic boundary 102. For instance, the communication layers 12 and 114 of the wireless device 2 and location transmitter 110, respectively, may implement Bluetooth technology. In such Bluetooth implementations, the location transmitter 110 may continually transmit packets containing an Inquiry Access Code (IAC) to establish communication with any wireless devices 2 within the geographic boundary 112. The wireless device 2 may then respond to establish a connection with the local transmitter 110. Upon establishing the connection, the local transmitter 110 may then transmit the geographic boundary 116 and location description 118 through communication layer 114 to the communication layer 12 of the wireless device 2. Further details of Bluetooth communication technology are described in the publication "Bluetooth (™): Connect Without Cables" by Jennifer Bray and Charles F. Sturman (Copyright 2001, Prentice Hall), which publication is incorporated herein by reference in its entirety. In alternative implementations, the communication layers 12 and 114 may utilize wireless communication protocols other than Bluetooth known in the art to perform the communication operations described herein, such as the wireless LAN architecture standard proposed in IEEE 802.11.

Figure 5:
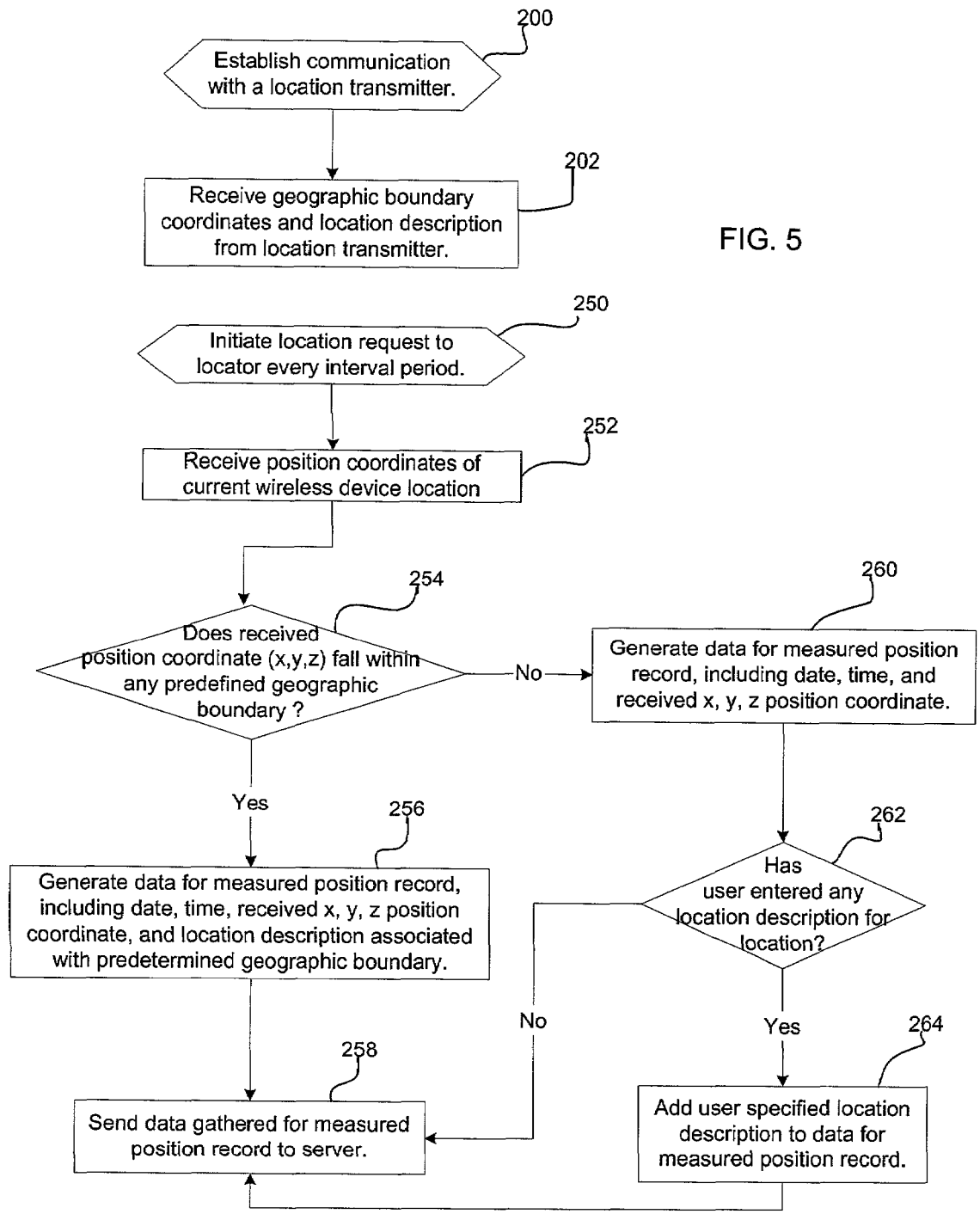
FIGS. 5, 6, and 7 illustrate flowcharts of code logic to gather, process, and use location information in accordance with implementations of the present invention.
Figure 6:
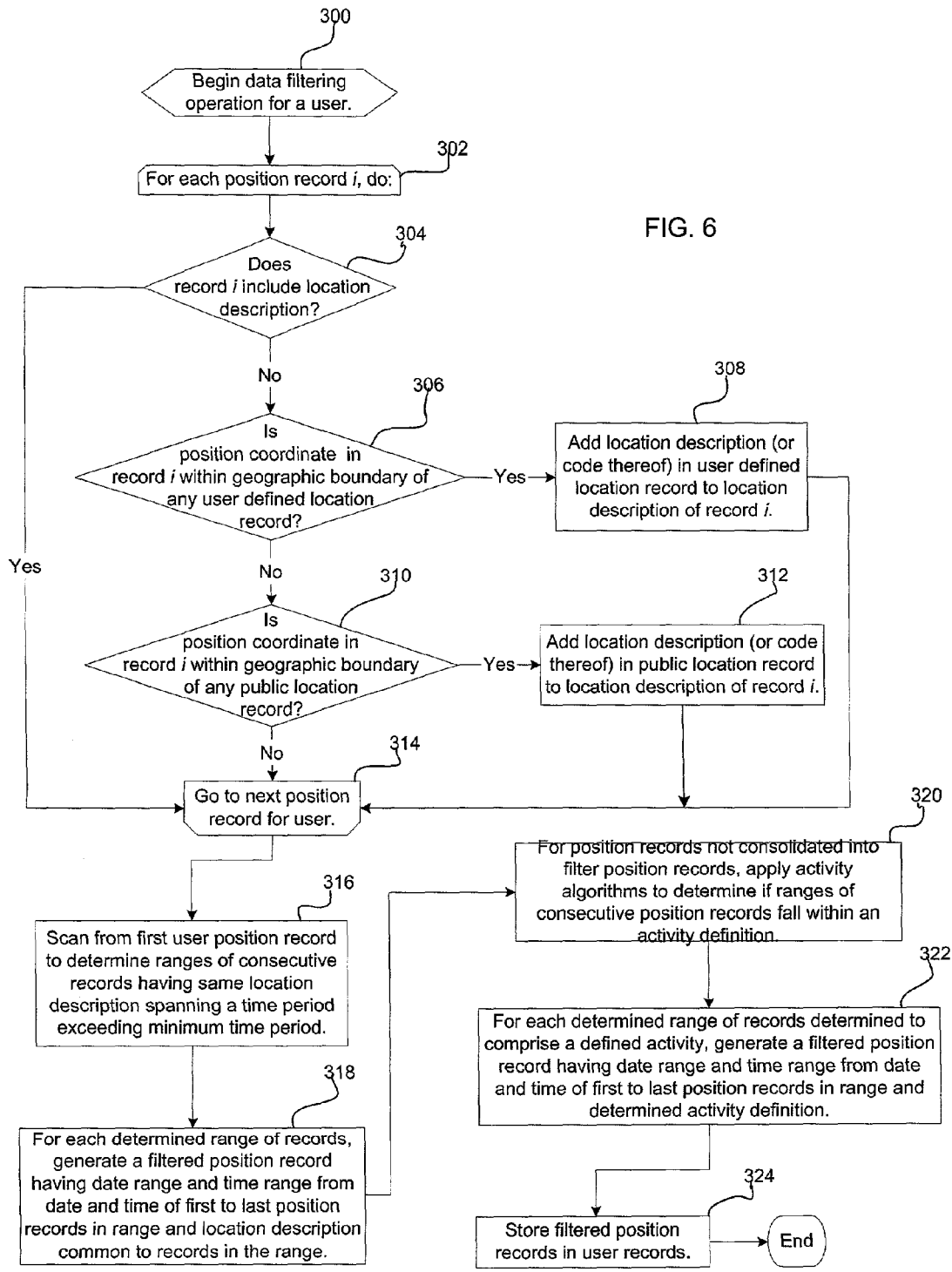
Figure 7:
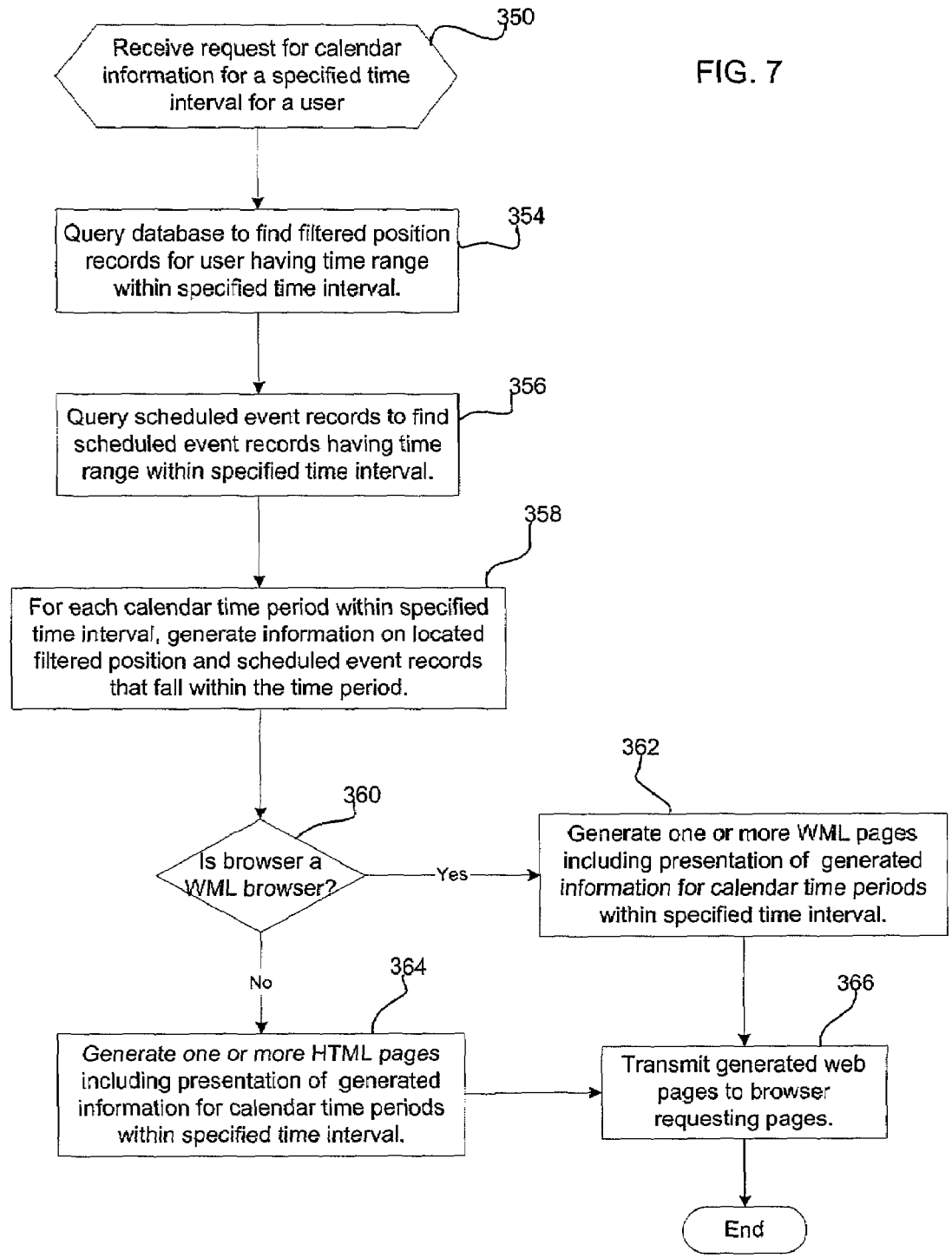

FIGS. 5–7 illustrate logic implemented in the PIM client 20 and server 24 to gather and utilize position information concerning the wireless device 2. FIG. 5 illustrates logic implemented in the PIM client 20 to gather position information to provide to the PIM server 24 to include within measured position records 54 in the database 22. At block 200, the wireless device 2 establishes communication with a location transmitter 110, using the Bluetooth technology or other wireless technology known in the art. After establishing a connection with the location transmitter 110, the PIM client receives (at block 202) a geographic boundary 116 comprised of X, Y, Z coordinates defining a three dimensional boundary on earth and location information describing the geographic boundary 116.

To provide data to the PIM server 24, the PIM client 20 performs steps 250 through 264 in interval time periods, e.g., every few seconds, minute, etc., to measure the current location and generate measured position records 54. At block 250, the PIM client 20 initiates a location request to the locator 14 or other unit to determine the current position coordinate (x, y, z) of the wireless device 2. Upon receiving (at block 252) the position coordinate from the locator 14, the PIM client 20 determines (at block 254) whether the received position coordinate falls within any predefined geographic boundaries supplied by a location transmitter 110, the PIM server 24, a user defined location record 56, or any other geographical boundary maintained by the PIM client 20. If so, the PIM client 20 generates (at block 256) data for a measured position record 54, including the received position coordinate, the date and time the coordinate was determined, and any location description associated with the predefined geographic boundary including the received position coordinate. The gathered data is then sent (at block 258) to the PIM server 24 to include as a position record 54 in the user records 50.

If (at block 254) the received position coordinate did not fall within any predefined geographic boundary, then the PIM client 20 generates (at block 260) data for a measured position record 54 including the received X, Y, Z position coordinate and the date and time the coordinate was measured. If (at block 262) the user has entered through the input mechanism 16 any location description for the current location through the input mechanism 16, then the PIM client 20 adds (at block 264) the user specified location description to the data for the measured position record. From block 264 or the no branch of block 262, the PIM client 20 transmits the data for the measured position record 54 to the PIM server 24 to include in the user records 50.

FIG. 5 provides logic implemented in the PIM client 20 to gather the position records for each measured coordinate. FIG. 6 illustrates logic for a filtering algorithm that consolidates and interprets the measured position records 54 and generates filtered position records 60 that provide information on the user's whereabouts and activities for time periods. The filtering algorithms used to generate the filtered position records 60 may be implemented in either the PIM client 20 or PIM server 24. In the event that the PIM client 20 executes the filtering algorithm, then the PIM client 20 would transmit the filtered position records 60 to the PIM server 54 to store in the PIM database 22.

With respect to FIG. 6, control begins at block 300 with the invocation of the filtering algorithm for the user records 50 of a particular user. A loop is performed from blocks 302 to 314 for each measured position record i in the user records 50 that has not yet been subject to filtering to add location description information 86 to the measured position record 64 if such data was not provided by the PIM client 20. If (at block 304) the measured position record i does not include any location description 86 data, then a determination is made (at block 306) as to whether the position coordinate 84 data in record i is within the geographic boundary of any user defined location records 56 of the user being considered. If so, then the location description 94 for the user defined location record 90 is added (at block 308) to the location description 86 data for the measured position record 64. If (at block 306) a geographic boundary was not located in the user defined location records 56, then a determination is made (at block 310) whether the position coordinate 84 data in record i is within the geographic boundary of any public location records 58. If so, then the location description 94 for the public location record 58 is added (at block 312) to the location description 86 data for the measured position record 64. From the yes branch of block 304 (if there is already location information added by the PIM client 20) or from blocks 308 or 312, control proceeds to block 314 to consider all the measured position records 54 for the user. The related application entitled "Method, System, and Program for Providing User Location Information for a Personal Information Management System", having U.S. patent application Ser. No. 09/848,173 which is incorporated by reference in its entirety above, provides additional implementations for obtaining location description information from the user records for other entities and persons in the PIM database 22.

After the measured position records 64 are supplemented with location information from user defined 56 or public 58 location records, then control proceeds to blocks 316 to generate the filtered position records 60 that are particularly suited for use in a PIM or calendaring program. At block 316, the filter scans from the first user position record 54 to determine ranges of consecutive position records 54 having the same location description 86 spanning a time period exceeding a minimum time period. Thus, the filter is looking for position records indicating that the user was at a same location for a minimum time. The minimum time may be a time period of sufficient length that would be meaningful to display in a PIM interface, such as a calendar or schedule, e.g., 10 minutes, etc. For each determined range of records, a filtered position record 60 is generated (at block 318) having a date 100 and time 102 ranges from the date and time of the first to last position records in the determined range and having a location description 106 that is the common location description 86 found in the position records 54 in the determined range. In this way, a single filter position record 50 is generated that defines a location position that was maintained for a minimum time.

At block 320, activity algorithms may then be applied to those position records not consolidated into filtered position records 58 at block 316 and 318. An activity algorithm would analyze a series of consecutive measured position records and based on a rate of change in distance per unit of time, determine a predefined activity associated with the position records. For instance, a range of consecutive measured position records 54 whose position coordinate 84 (x, y, z) is rapidly changing may indicate that the user is traveling in an automobile or other transportation vehicle. Other rate of changes may indicate other activities, e.g., walking, running, bicycle riding, etc. For each determined range of measured position records 54 that define an activity, a filtered position record 60 is generated (at block 322) having a date 100 and time 102 ranges from the date 80 and time 82 of the first and last measured position records 54 in the range and an activity description field 106 set to the activity determined for the range. The geographic location field 104 may comprise a range of first and last locations for the activity, wherein the first location would comprise the location 84 data from the first measured position record 64 in the range for the activity and the last location would comprise the location data 84 from the last record 84 in the range. Thus, in certain described implementations, a filtered position record 60 indicates a time period during which a user was at a location, defined by a geographic boundary or a time period during which the user was engaged in an activity involving movement from one location to another.

The filtered position records 60 are then stored (at block 324) in the PIM database 22 for later use. The filtered position records 60 provide more useful descriptive information than the measured position records 54 because they indicate time periods spent at meaningful geographic locations or engagement in a particular activity.

FIG. 7 illustrates logic implemented in the PIM server 24 to generate calendar information that can be displayed at the wireless device 2 or some other computer in communication with the server 4, such as a desktop computer accessing the server 4 over the Internet. Control begins at block 350 with a request for PIM information for a time interval for a user. In response, the PIM server 24 queries the PIM database 22 for filtered position records 60 (at block 354) and scheduled event records 52 (at block 356) of the user within the specified time interval. The PIM server 24 then generates (at block 358) for each calendar time period, e.g., every half-hour, hour, etc., information on the scheduled event description 74 and the location/activity description 106 (FIGS. 3a, d) in the located scheduled event 52 and filtered position 58 records, respectively, that fall within the calendar time periods that span the specified time interval.

If (at block 360) the viewer program requesting the calendar information for the time period is a WML browser on a small device, e.g., the wireless device 2, then the PIM server 24 generates (at block 362) one or more WML pages including a presentation of the information generated for each calendar time period in the user specified time interval including information on user scheduled events and actual location/activity. Otherwise, if the viewer or browser requesting the calendar information includes a larger display area, then the PIM server 24 generates (at block 364) one or more HTML pages including the presentation of the generated calendar information. From blocks 362 or 364, control transfers to block 366 to transmit the generated web pages to the browser requesting that page. Alternatively, the PIM server 24 may include the generated calendar information in an Extensible Markup Language (XML) or other file that is sent to the PIM client 20 to render on the local display. Thus, the calendar information presented to the user may include a description of user scheduled events as well as information on the geographical locations the user associated with the wireless device 2 visited during the specified time interval.

FIG. 8 illustrates an example of calendar information for the user specified time period presented in a calendar window 400 rendered on a computer display monitor. As shown, the calendar displays both user scheduled events 402 from the scheduled event records and actual location/activity 404 from the filtered position records for calendar times 406 during the specified time interval. In this way, the user may compare what was scheduled with what actually materialized. Moreover, in implementations where the PIM server 24 updates the user calender information in real time and generates real time filtered position records, the calendar 400 could display the user's current geographical location. This information could be useful for business associates and others interested in the user's location. Additionally, the actual location/activity 402 may be displayed in an abbreviated format. The user may use an input device to selectively display further details on the actual location/activity. For instance, the user may move a mouse input device over the displayed abbreviation of the actual location/activity or click the displayed abbreviation to cause the display of more detailed information on the actual location/activity in the calendar window 400.

FIGS. 9*a*, *b* illustrate how calendar information may be displayed on a display 18 of a wireless device 2 having limited display space. FIG. 9*a* illustrates a small displayed monthly calendar. Upon user selection through the input mechanism 18 of a particular day, e.g., February 5$^{th}$, the PIM client 20 displays the view shown in FIG. 9*b* which provides information of scheduled events 450 and actual user location/activity 452 for a portion of the calendar times 454 during the user requested time interval. The user can use the input mechanism 18 to scroll downward to view further calendar entries.

The described implementations provide a technique for gathering and utilizing user position information for use with a PIM or calendaring program. This position information may be provided to the user and those authorized by the user to track actual activity versus scheduled activity.

Shadowing Calendar Events

Figure 10:
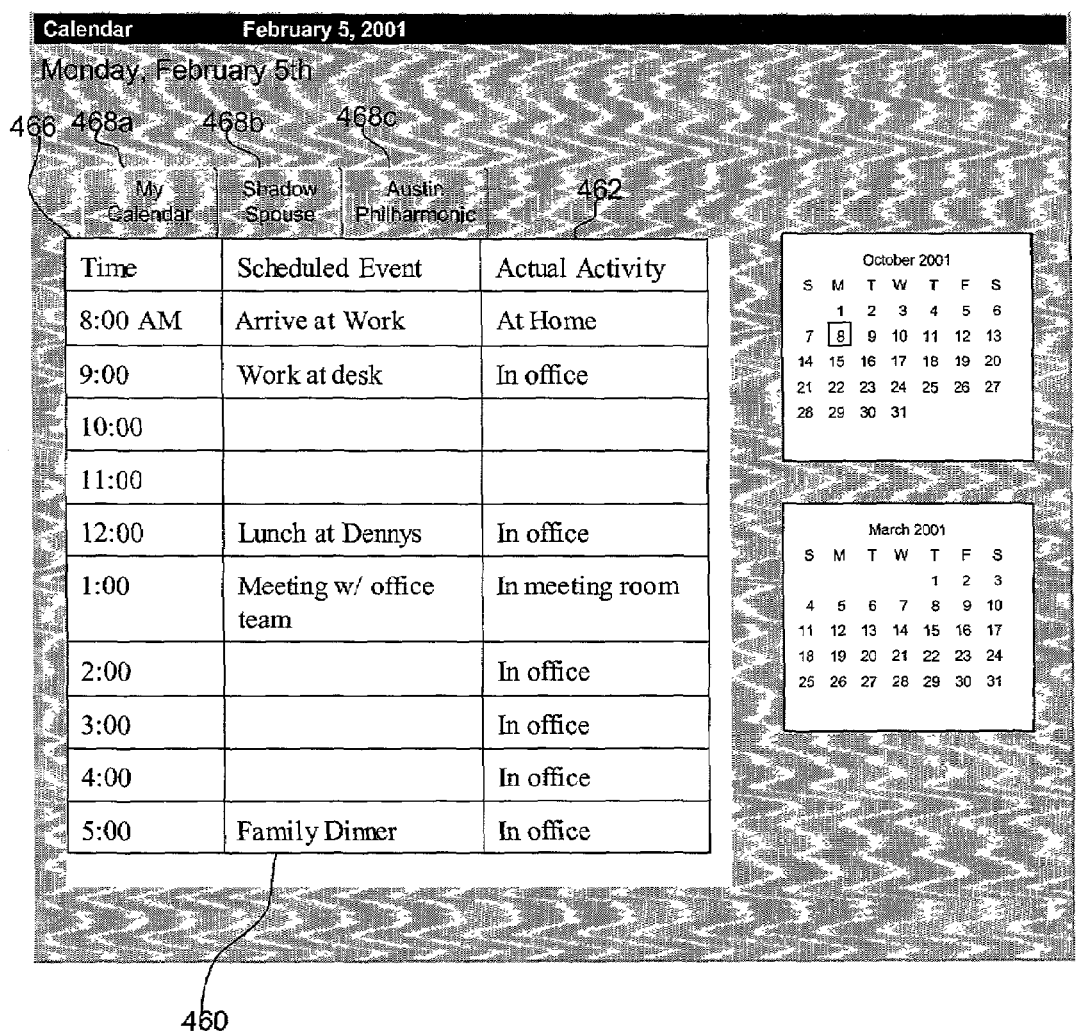
FIGS. 10, 11, and 12 illustrate further examples of a display of a calendar including shadow calendar capabilities in accordance with implementations of the present invention.
Figure 11:
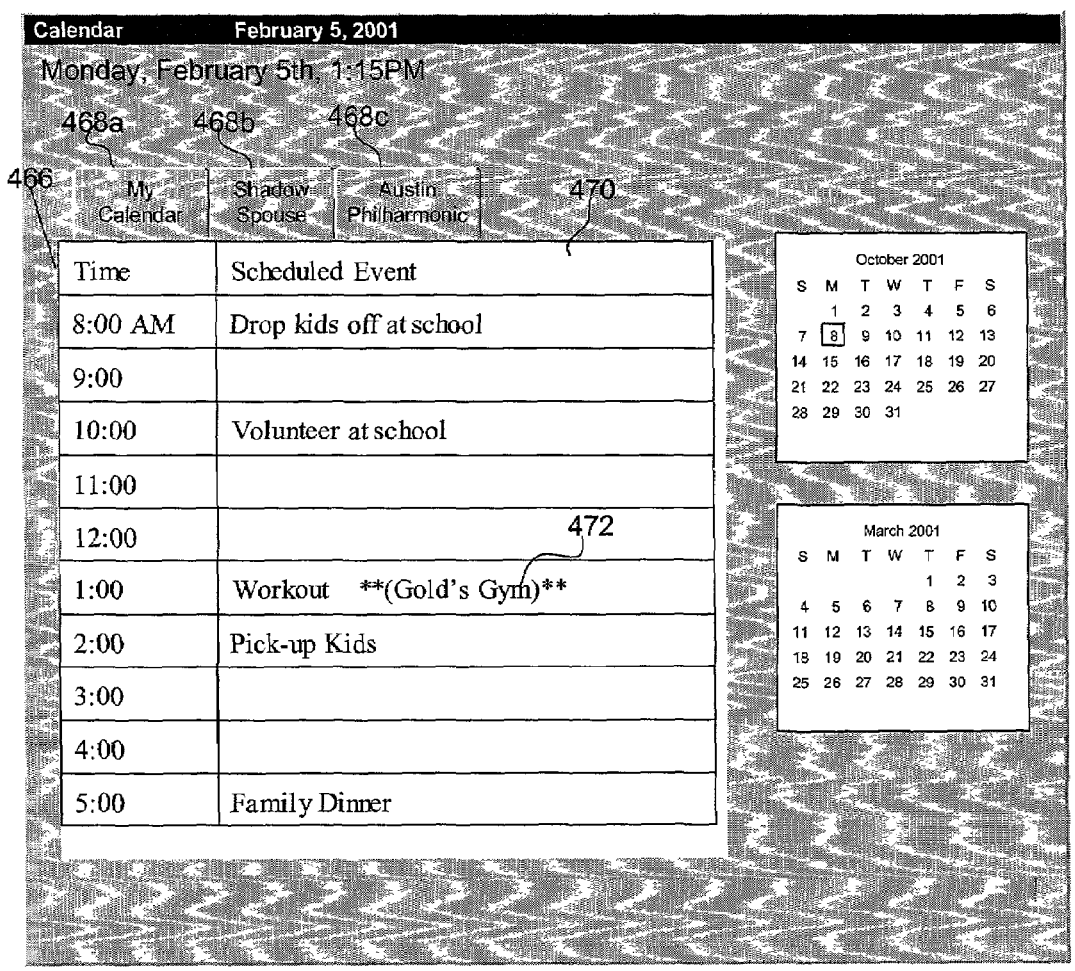

In certain implementations, the personal information management system may include the capability to allow users having user records 50 in the database to shadow the schedule or location of other users in the system, so that a user can view user records 50 of another user or entity. FIG. 10 illustrates a calendar including the features described with respect to FIG. 8 and additionally including three tabs 468*a*, *b*, *c*. Selection of tab 468*a* causes the display of the user's own personal calendar as shown in FIG. 10. Tabs 468*b* and *c* provide displays of shadow calendars, to allow the user to view scheduled activities and current actual location of another user, e.g., the "spouse", and the scheduled events of an organization, e.g., the Austin philharmonic. FIG. 11 illustrates the shadow calendar schedule of the spouse displayed in response to user selection of the "Shadow Spouse" tab 468*b*, including the current location of the wireless device 2 used by the shadowed spouse. In this way, the user may view the schedule of another shadowed user, including the current location of their wireless device 2. The schedule of the shadowed person could also display an actual activity column 402 as shown in FIG. 8.

Figure 12:
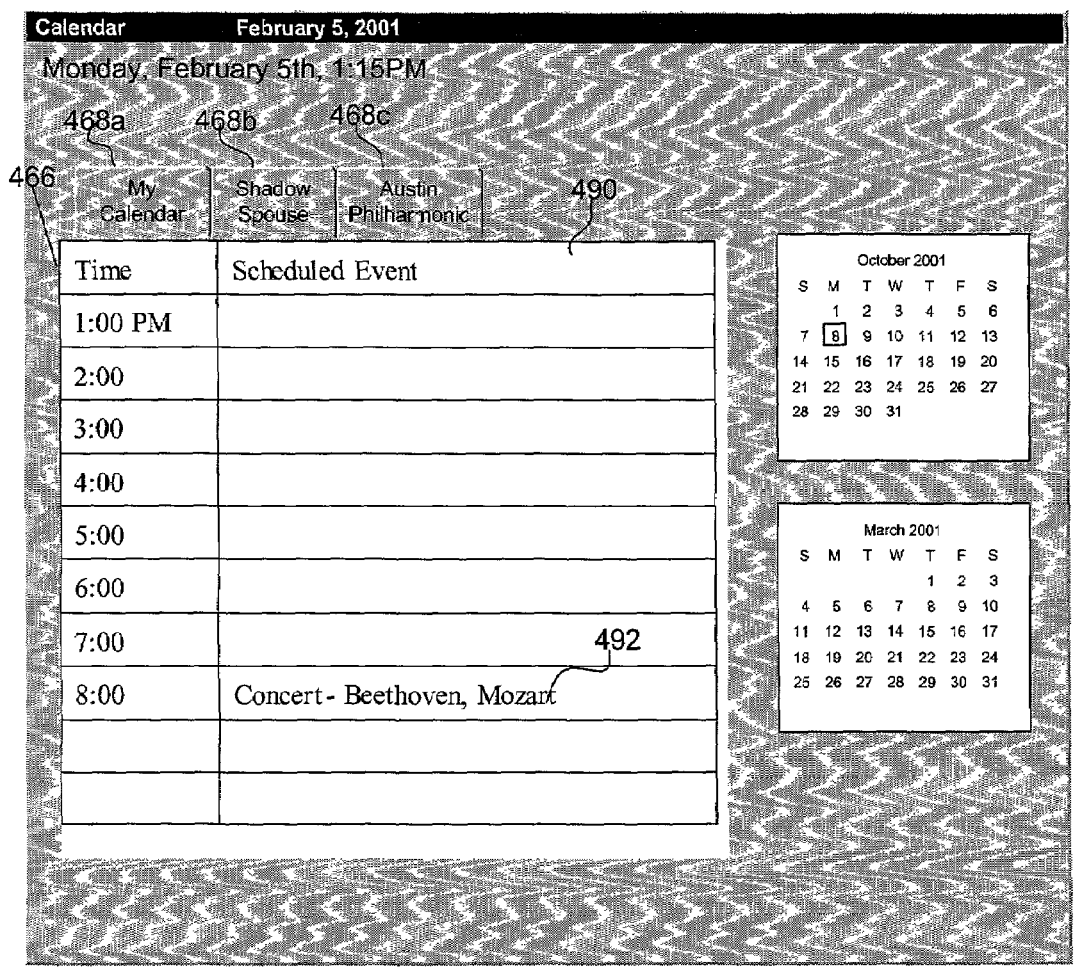

FIG. 12 illustrates the shadow schedule of events for an organization, which in the example is the Austin philharmonic, that is displayed in response to user selection of the "Austin Philharmonic" tab 468*c*. An organization's shadow schedule would display events sponsored by the organization, such as a concert performance by the Austin philharmonic.

Figure 13:
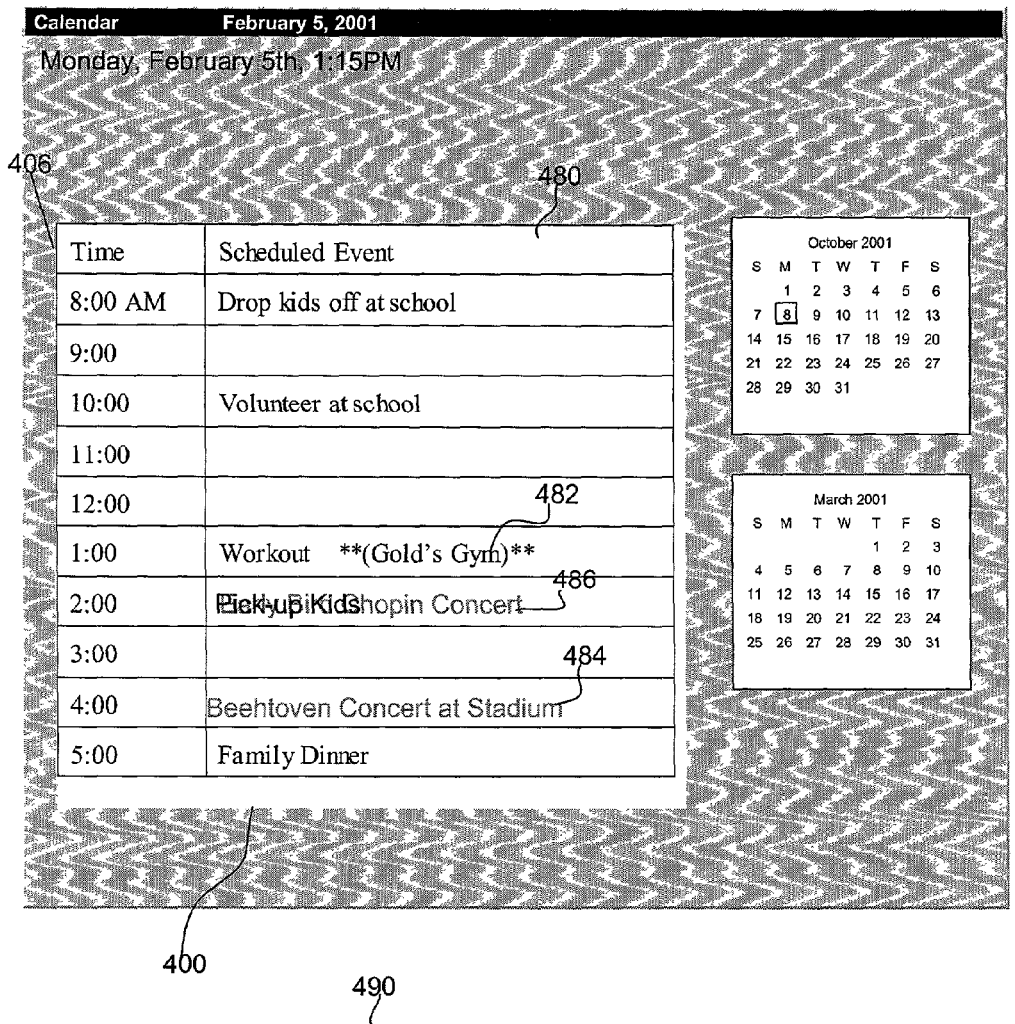
FIGS. 13 and 14 illustrate further examples of a calendar including shadow capabilities in accordance with implementations of the invention.

FIG. 13 illustrates an additional implementation of the user calender where the shadowed schedule of events is displayed as transparent text 484 superimposed onto the calendar, such as the transparent "Beethoven Concert". The user may select a function key or other control to display shadowed events as superimposed transparencies over the user schedule, and turn on and off the display of the transparent shadowed schedule of events. These above display mechanisms display the shadowed schedule of events as "optional events" that the user may selectively add to the regular scheduled event records 52 (FIG. 3*a*) that are displayed as regular scheduled events. In this way, the shadowed events are not "hardened" scheduled events. Further, the shadowed schedule of events would not appear as user scheduled events when others view the user calendar, but only become hardened scheduled events if the user selects to add shadowed events to the user schedule by converting the shadowed event to a scheduled event record 52 in the user records 50.

Figure 14:
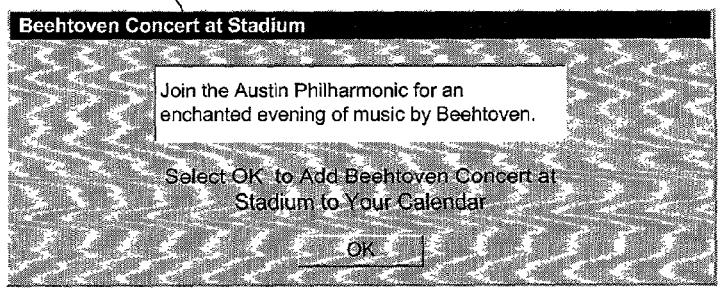

Selection of the shadowed event may display dialog box 490 shown in FIG. 14 which displays further information on the shadowed event as well as a button 492 to allow the user to add the shadow event to the user scheduled event records 52 to be displayed as a regular scheduled event.

Moreover, in certain implementations, the shadowed event does not override or conflict with a regular user scheduled event record 52. For instance if a user schedules two user events at the same time, for which separate scheduled event records 52 would be created, then a conflict signal may be generated notifying the user of the conflicting scheduled events. However, for shadowed events, if the shadowed event is scheduled at the same time as a regular user scheduled event, then the shadowed event may be displayed as a transparency over the regular scheduled event, as shown as the transparent text 486 in FIG. 13. In such case, no conflict signal would be generated indicating an attempt to schedule conflicting appointments because the shadowed event is an event from another entity the user is monitoring and is not considered an event the user is adding to their own schedule. The user may select to accept or "harden" the shadowed event, which would transform the shadowed event into a user scheduled event record 52. User selection to harden the shadowed event into a regularly scheduled event may override any previous scheduled event for that time slot.

The user may select users to shadow to view their scheduled event records 52. However, permissions may need to be granted to shadow an individual, whereas organizations, such as businesses, may allow any data base user to shadow scheduled events. For instance, a business may schedule sales, promotions, and other commercial related events that a database user can shadow in their calendar.

Figure 15:
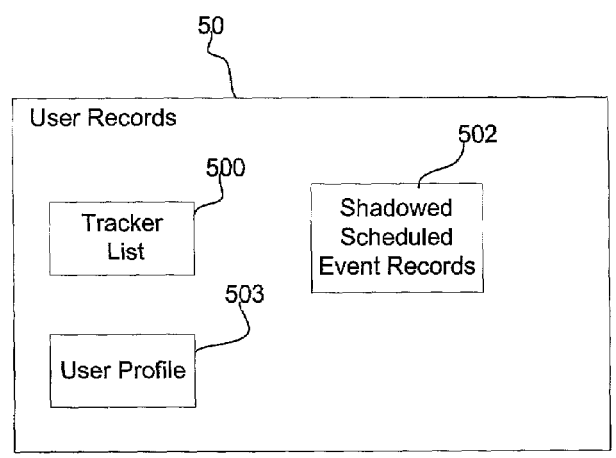
FIG. 15 illustrates further records maintained for users in the PIM database in accordance with implementations of the present invention.

FIG. 15 illustrates further details of data structures included in the user records 50 to implement shadowing. The user records 50 would include the data structures shown in FIG. 2 and additionally include a tracking list 500, shadowed scheduled event records 502, and a user profile 503 (FIG. 15). In one implementation, to allow users to shadow other calenders or scheduled event records 52 of other users, the user records 50 of those whose schedule is being shadowed would include a tracking list 500 providing a unique identifier of those users registered to track the calendar events of others. Further, the user records 50 of those users tracking other users', i.e., tracking users, scheduled events would include one or more shadowed scheduled event records 502. A user profile record 503 includes descriptive information on the user associated with the user records 50, such as a unique identifier, contact information to communicate with the user via the wireless device 2 or a separate communication device, e.g., telephone numbers, e-mail, chat identifier, pager, etc.

Figure 16:
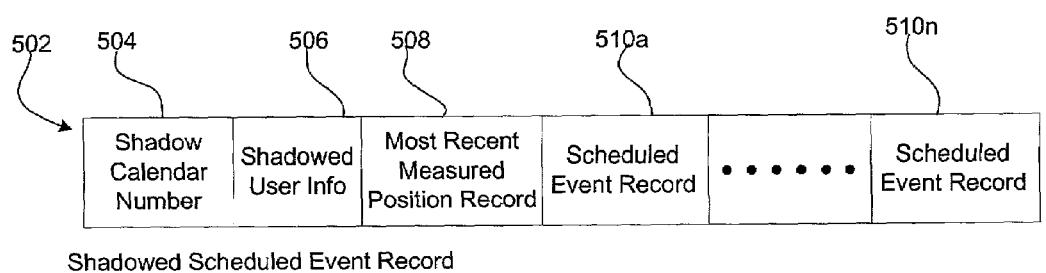
FIG. 16 illustrates a shadowed scheduled event record in accordance with implementations of the present invention.

In certain implementations, the user records 50 would maintain one shadowed scheduled event record 502 for each shadowed user. FIG. 16 illustrates an implementation of a scheduled event record 502 where each scheduled event record 502 includes all the data for one shadowed user. A shadow calendar number 504 comprises a unique number assigned to each scheduled event record to identify the scheduled event record in the user records 50. Shadowed user information 506 provides the unique identifier of the user in the PIM database 22 being shadowed, descriptive information on the shadowed user, such as contact information, etc. A most recent measured position record 508 comprises the most recent measured position record 54 (FIGS. 2, 3*b*) of the shadowed user that is used to provide information on the current location of the shadowed user. Following are one or more scheduled event records 510*a* . . . *n* of the shadowed user, which may comprise the scheduled event records 52 to be displayed in the tracking user's calendar, where the tracking user is the user registered in the tracker list 500 who views or tracks another's scheduled events and location information. The scheduled event records 510*a* . . . *n* may include the date, time period, and description for the scheduled event, as shown in FIG. 3*a*. In alternative implementations, the shadowed scheduled event records 502 may be maintained in one location of the database 22 and the tracking user records would include a pointer to the shadowed scheduled event records.

In the above described implementations, the shadowed scheduled event records 502 are maintained with the tracking user records 50 in the PIM database 22. Alternatively, the shadowed scheduled event records 502 may be maintained locally in the wireless device 2 of the tracker for use by the PIM client 20 in rendering the shadowed calendar information in response to selection of the shadow tabs 468*a*, *b* (FIGS. 10, 11, and 12). In such alternative implementations, the shadowed scheduled event records 502 would not be stored in the tracking user records 50 in the PIM database 22 as shown in FIG. 13.

Figure 17:
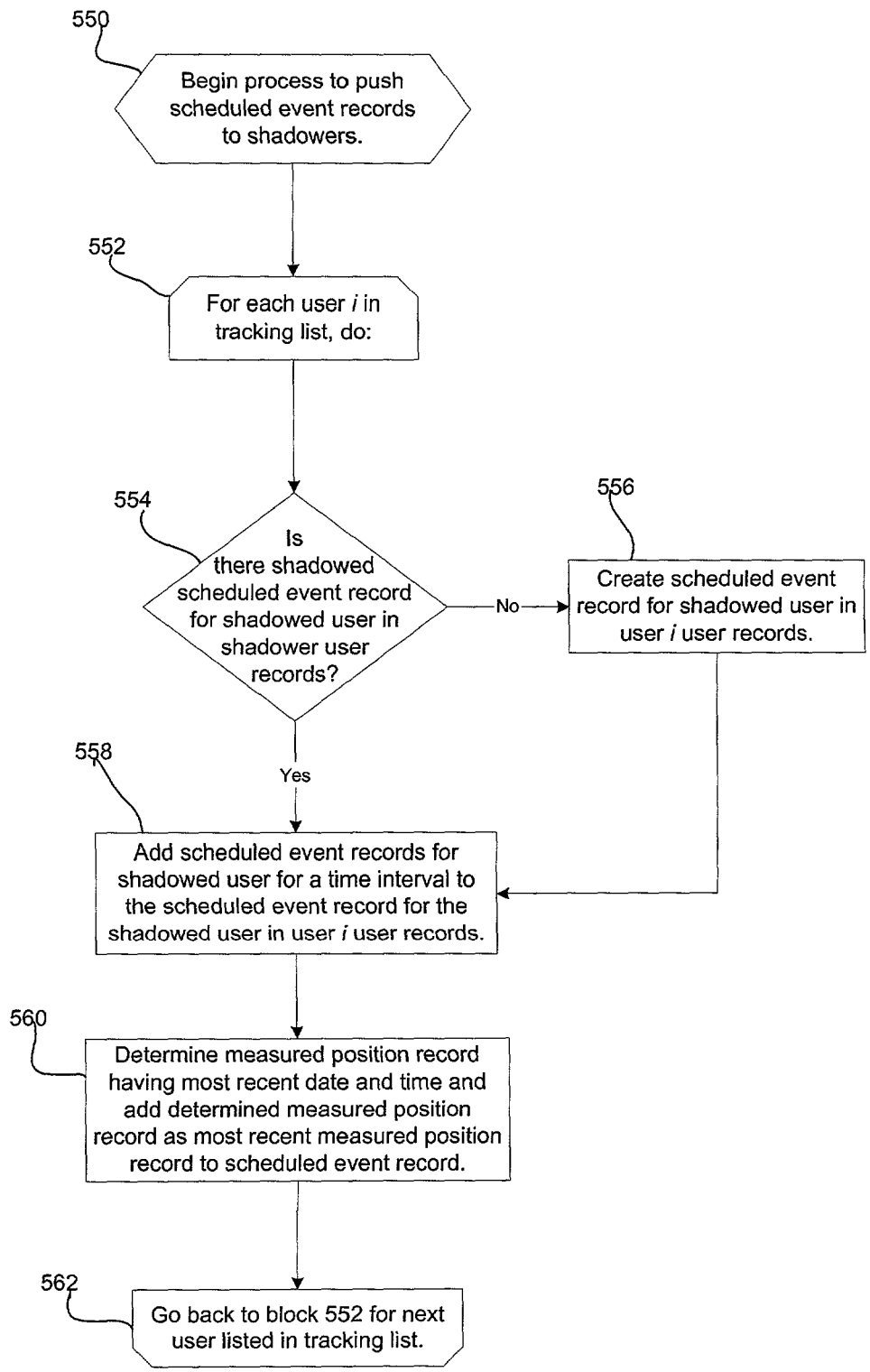
FIG. 17 illustrates logic to provide database information on shadowed users in accordance with implementations of the present invention.

FIG. 17 illustrates logic implemented in the PIM server 24 to push shadowed scheduled events to the user records 50, or wireless devices 2, of tracking users. The process to push shadowed scheduled event records beginning at block 550 may be performed periodically or in response to an update to one of the scheduled event records 50 of the shadowed user or to adding a new user to the tracking list 500. Blocks 552 to 560 comprises a loop performed for each user i listed in the tracking list 500. At block 554, the PIM server 24 determines whether there is a shadowed scheduled event record 502 for the shadowed user in the user records 50. If not, then the PIM server 24 creates (at block 556) a new shadowed scheduled event record 502 in the user records 50 of user i, including a shadowed calendar number 504 and shadowed user info 506. From the yes branch of block 554 or 556, the PIM server 24 adds (at block 558) shadowed user scheduled event records 50 for a time interval to the shadowed scheduled event record 502 of the tracking user records 50. As discussed, in alternative implementations, the PIM server 24 may communicate the shadowed scheduled event records 502 to the tracking user's wireless device 2, and not maintain a copy in the tracking user records 50. The PIM server 24 would further determine (at block 560) the measured position record 54 in the shadowed user records 50 having the most recent date 80 and time 82, and add the determined measured position record 54 to the most recent measured position record 508 in the shadowed scheduled event record 502 of the tracking user. The PIM server 24 performs (at block 562) another iteration of the loop beginning at block 552 for the next tracking user in the tracking list 500 shadowing the scheduled event records.

With the logic of FIG. 17, the PIM server 24 pushes data from shadowed user records to the tracking user records 50 or wireless device 2. The PIM server 24 would perform the logic of FIG. 17 for every user in the PIM database 22 whose user records 50 include a tracking list 500. In alternative implementations, the PIM client 20 may pull the shadowed scheduled events and other information from the shadowed user records 50 in the PIM database 22 on an as needed basis when the tracking user of the wireless device 2 selects one of the shadow tabs 408*b*, *c* to display a shadowed calendar.

Figure 18:
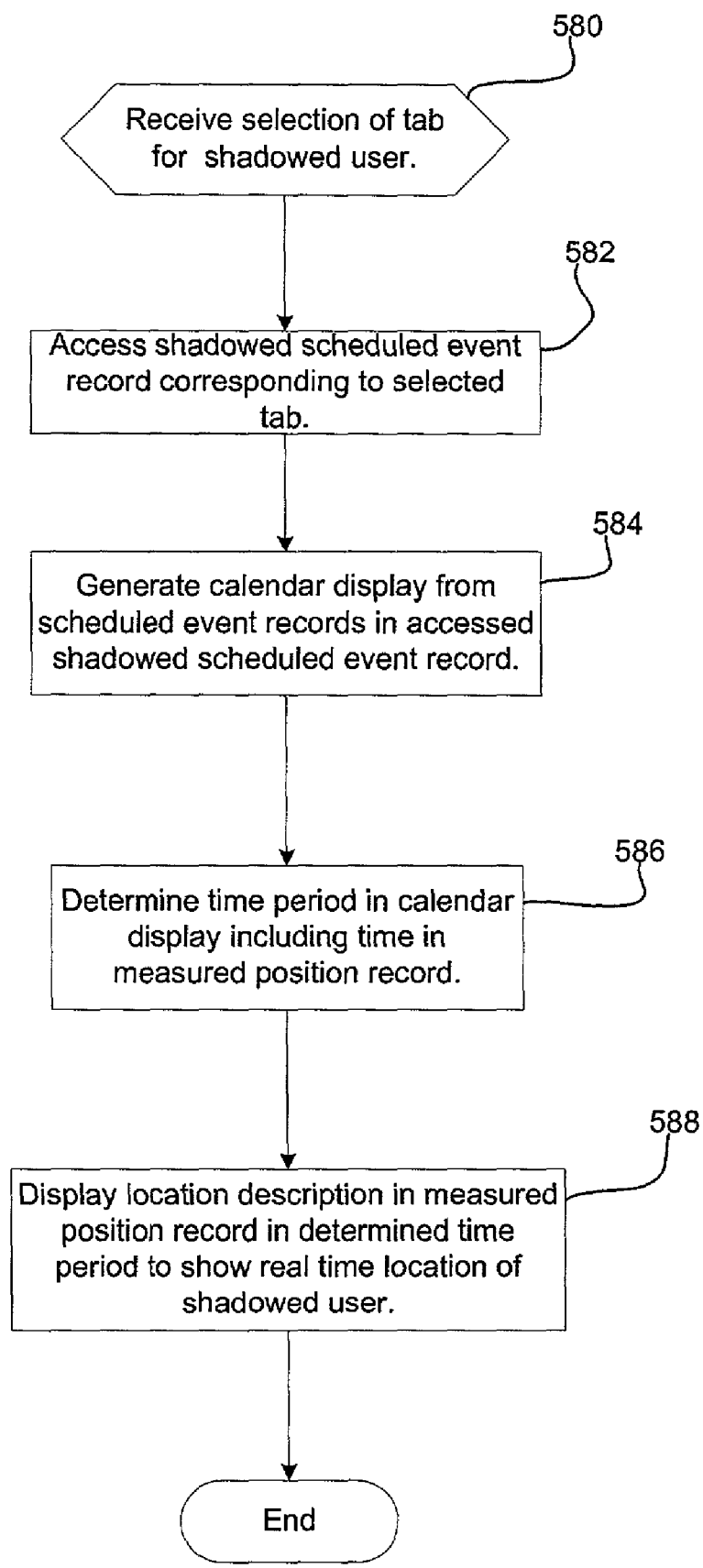
FIG. 18 illustrates logic to generate information on shadowed users in accordance with implementations of the present invention.

FIG. 18 illustrates logic implemented in the PIM client 20 to display shadowed scheduled event records on the display 18 of the wireless device 2 (FIG. 1) as shown with respect to FIGS. 11 and 12. At block 580, the PIM client 20 receives user selection of one of the shadow tabs 408*b*, *c*. In response, the PIM client 20 accesses (at block 582) the shadowed scheduled event record 502 corresponding to the selected tab 408*b*, *c*. The database 22 may maintain a mapping of displayed tabs to shadowed scheduled event records 502 using the shadow calender number 504. The PIM client 20 then generates (at block 584) a calendar display on the display 18, such as shown in FIGS. 11 and 12, displaying the scheduled events for a time interval. A determination is made (at block 586) of the displayed calendar time period including the time of the most recent measured position 508. The PIM client 20 then displays (at block 588) the location description 86 from the determined most recent measured position record 508 in the determined period to show the real time location of the user in the calendar display, such as the real time location 410 displayed in the calendar shown in FIG. 11.

The logic of FIG. 18 allows a user to separately view scheduled events of shadowed users or entities. Alternatively, the scheduled events of different shadowed users may be displayed on the same calendar page showing shadowed scheduled events from different users.

In further implementations, the location information displayed in the shadowed calendar window, e.g., location information 472 (FIG. 11), may comprise a hypertext link to allow a user to access further information on the displayed location of the shadowed users. Further, the displayed shadowed scheduled events in the calendar windows may also comprise hypertext links. For instance, if the shadowed entity comprises a business or organization, then the hypertext link of the scheduled event for the organization, such as a scheduled concert, sporting event, etc., may be selected to access further information on the scheduled event. For instance, if the business entity promoting the shadowed events is selling access or seats to the event, such as sporting events, theatrical productions, concerts, etc., then selection of a hypertext link description of the event may cause the PIM client 20 to display a window in which the user may purchase tickets for an event, reserve seats, etc.

In additional implementations, the PIM client 2 and PIM server 24 may include the capability to allow the user viewing shadowed events to contact or obtain information on the shadowed user. For instance, the current location of a shadowed user may be displayed in the shadow calendar as a hypertext link, as the current location 400 shown in FIG. 11. Selection of the hypertext link of the current location 472 or some other interface button on the calendar window of FIG. 11 may display a communication window 600 shown in FIG. 19 on the display 18 of the wireless device 2 (FIG. 1). The displayed communication window 600 may include a direct communication drop down list 602 which allows the user to select an available channel to use to communicate directly with the shadowed user, such as a phone, e-mail, pager, on line chat, etc. The available channel may allow direct communication with the wireless device 2 of the shadowed user or communication with a separate device possessed by the shadowed user. Selection of one of the communication channels through the drop down list 602 and the GO button 604 would provide further information on the communication channel or invoke the selected communication technique through the tracking user's wireless device 2. For instance, if the wireless device 2 is a telephony device, then selection of the GO button 604 may dial the shadowed user's phone number, send an e-mail, call the shadowed user's pager, establish a chat session, etc. In this way, through the shadowing feature, a user may not only view the shadowed user's current location, but also establish direct communication with the shadowed user.

The communication window 600 further includes a proximate device drop down list 610 through which the user may establish communication through a third party proximate device having user records in the database. For instance, drop down menu 610 lists communication channels with users within a proximate distance from the shadowed user that may be invoked to communicate with the proximate user. In this way, the user may communicate with a proximate user about the shadowed user. Still further, the proximate user may comprise a location transmitter 110 (FIG. 4) that streams real time video from the current location of the shadowed user. If so, then the user may use the drop down menu 610 to select the location transmitter 110 to access real time video from the location to view the shadowed user at the location through the display 18 of the wireless device 2.

The video aspect could be particularly useful for parents who want to observe their young children at day care or school. If the child carries a wireless device 2 and is a shadowed user and the child care or school includes a location transmitter 110 providing real time video streaming, then the user may use the drop down menu 610 to select the school location transmitter 110 to access streaming real time video of the location including their child. Further, a school or day care may include location transmitters 110 at numerous locations, within classrooms, in the play yard, lunch room, etc., to allow a parent to view a shadowed child at their specific location in the school.

The user of the device receiving the information to use to contact a proximate user, transmitter location 110 or the shadowed user directly may use the device including the PIM client 20 to communicate or use another device separate from the device including the PIM client 20.

Further, a company may charge a fee to users for the privilege to shadow the schedule of a famous person, such as an entertainer, sports figure, etc. Users may further be allowed to view real time video of the shadowed user. The company may charge different levels of fees to access real time video from location transmitters 110. For instance, if you pay one fee you may just obtain shadowed calendar entries of the famous person. If you pay a further fee, you may be permitted access to the real time video capabilities of location transmitters 110 placed in spaces that the famous person visits, such as a gym, clubs, restaurants, galas, etc. Further, politicians may allow users to shadow their schedule and permit viewers to view real time video of the politician when attending public spaces including a location transmitter 110 with real time video streaming capabilities.

Figure 19:
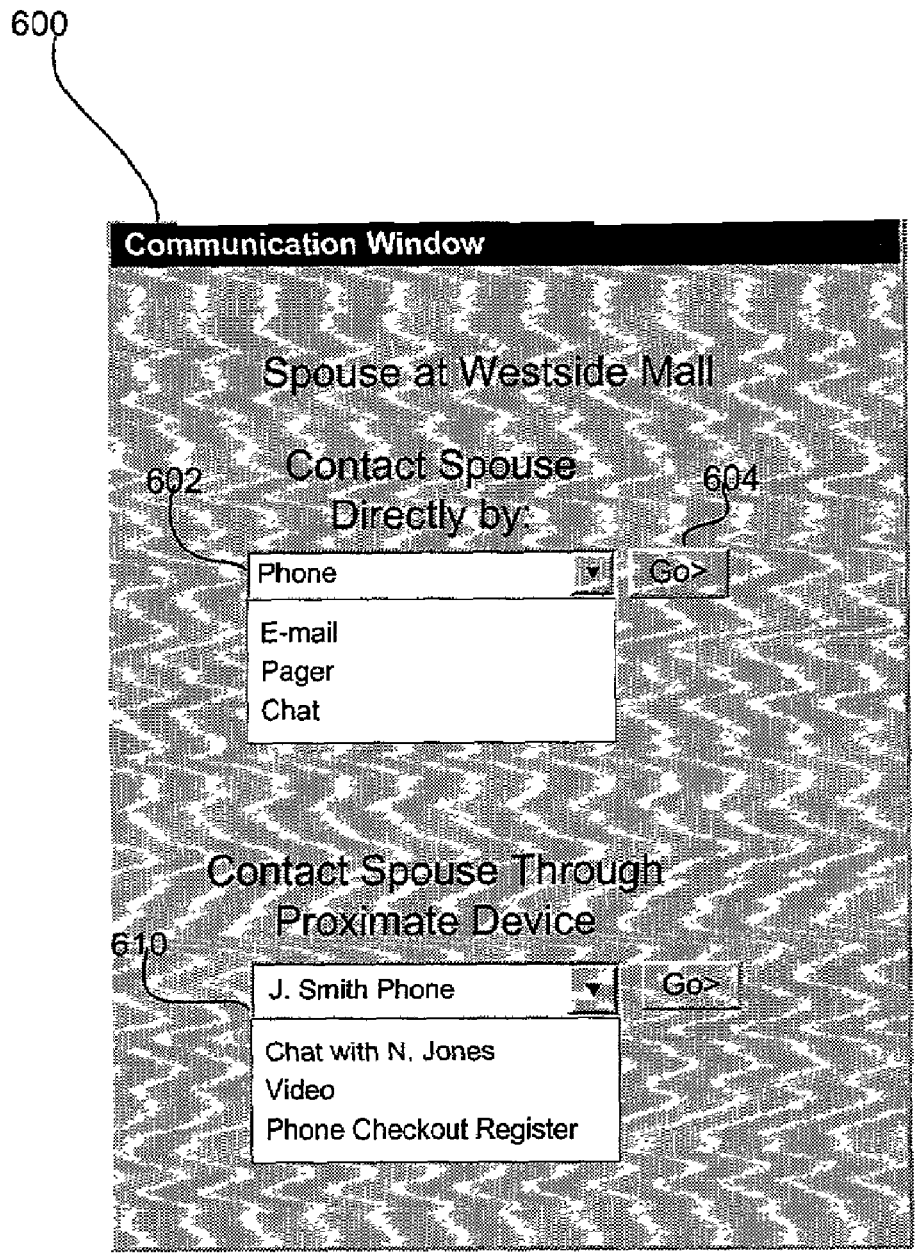
FIG. 19 illustrates a user interface to access a shadowed user in accordance with implementations of the present invention.
Figure 20:
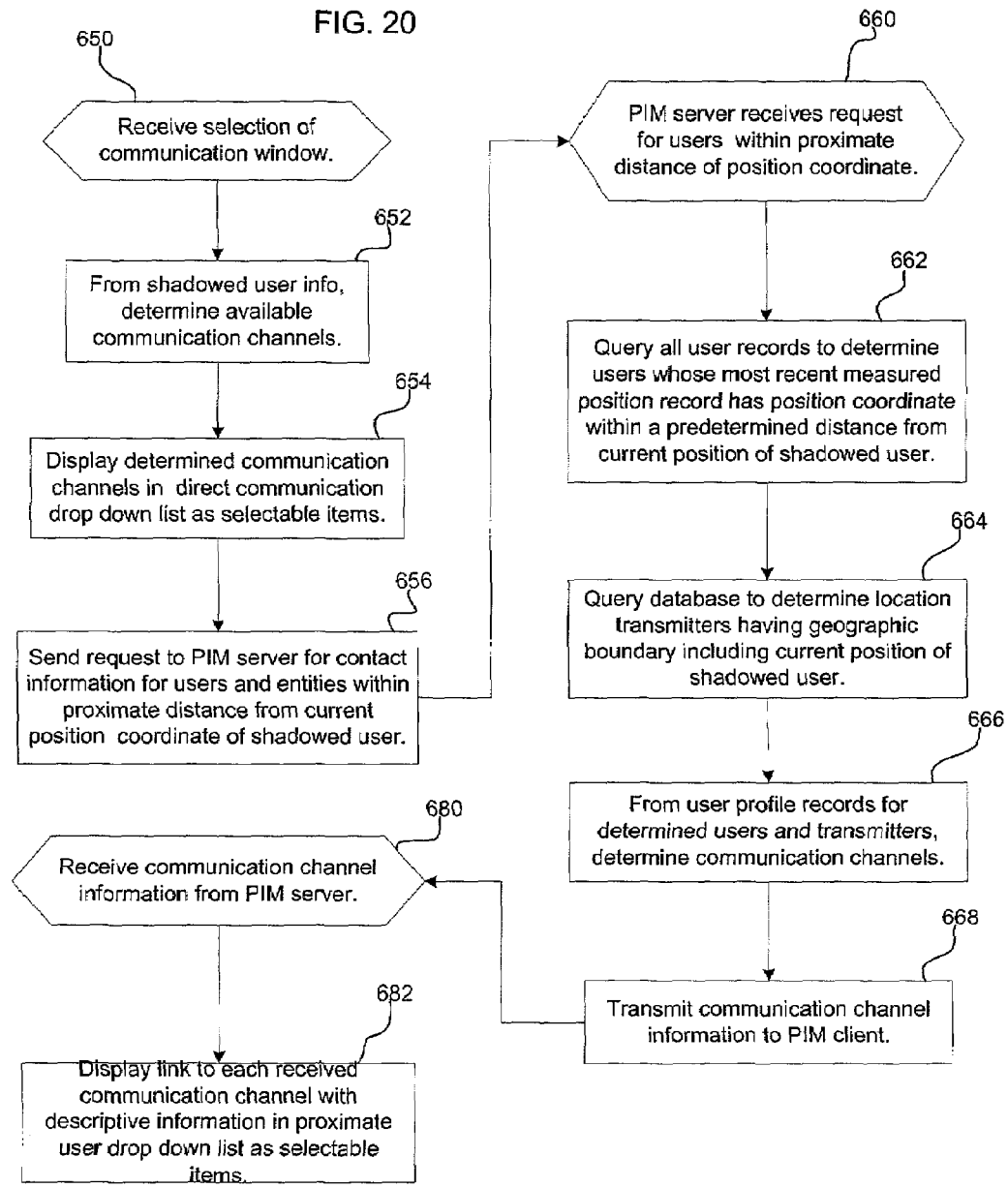
FIG. 20 illustrates logic to provide contact information to access the shadowed user in accordance with implementations of the present invention.

FIG. 20 illustrates logic implemented in the PIM client 20 and PIM server 24 to provide the communication channel information to use to populate the drop down lists 602 and 610 shown in FIG. 19. Blocks 650 to 656 illustrates logic performed by the PIM client 20 in response to receiving user selection of the communication window 600 (FIG. 16) at block 650. The PIM client 20 determines (at block 652) from the shadowed user information 506 (FIG. 14), the available communication channels for the shadowed user. As discussed, the shadowed user information 506 maintains user profile information on the shadowed user, which in certain implementations includes contact information, such as phone numbers, pager number, e-mail address, chat contact information, etc. The PIM client 20 then displays (at block 654) the determined communication channels in the direct communication drop down list 602 (FIG. 19) as selectable items. The PIM client 20 sends (at block 656) a request to the PIM server 24 for contact information for users and entities within a proximate distance from the shadowed user's current location included in the most recent measured position record 508 (FIG. 16).

In response to receiving (at block 660) the request for proximate user and entity contact information, the PIM server 24 performs blocks 662 to 668. At block 662, the PIM server 24 queries the user records 50 for all users in the PIM database 22 to determine those users whose most recent measured position record 54 (FIG. 3*b*), having the most recent date 80 and time 82, have a position coordinate 84 within a predetermined distance from the current position of the shadowed user. The PIM server 24 further queries (at block 664) the PIM database 22 for all location transmitters 110 (FIG. 4) having a geographic boundary 116 including the current position of the shadowed user. In certain implementations, the PIM database 22 may maintain user records 50 for location transmitters 110 to allow calendars to be generated for location transmitters 110 providing calendar information for the location associated with the location transmitter 110, e.g., the building, room, vehicle, etc. associated with the location transmitter 110. Such location transmitter 110 user records 50 may further include user profile 503 information that indicates the geographic boundary of coordinates associated with the location transmitter 110 and any remote communication capabilities at the location transmitter 110, such as video streaming capabilities, telephones, etc. The PIM server 24 then determines (at block 666) available communication channels for all the determined proximate users and location transmitters 110 and transmits (at block 668) the information on available communication channels to the PIM client 20.

In response (at block 680) to receiving the available communication channels from proximate users and location transmitters 110, the PIM client 20 displays (at block 682) a selectable description of each available communication channel in the proximate device drop down list 610 (FIG. 18).

The described implementations extend the PIM technology to allow users in the PIM database 22 to shadow the scheduled calendar events of other users in the PIM database 22 and monitor their current location. Further capabilities include access to direct or indirect communication channels to contact or observe the shadowed user.

Providing Information On Shadowed Users Via Instant Messaging

Figure 21:
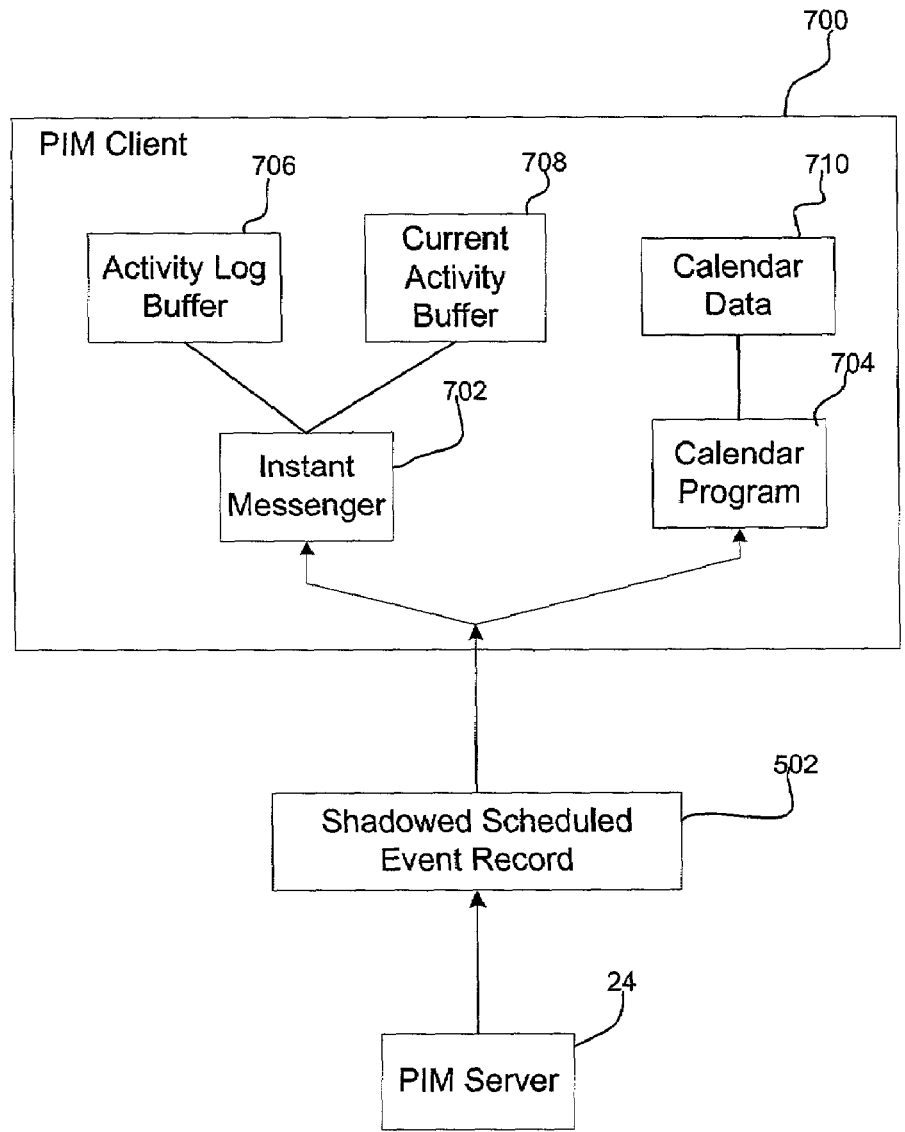
FIG. 21 illustrates further detail of program components in the PIM client in accordance with implementations of the present invention.

In additional implementations, instant messaging technology is used to provide the tracking user real-time information on changes in the user records 50 of the shadowed user. FIG. 21 illustrates an additional implementation of PIM client 20 in the wireless device 2 (FIG. 1) as PIM client 700. The PIM client 700 includes an instant messenger program 702 and calendar program 704. The calendar program 704 would perform all the operations to receive calendar related information from the PIM server 24 and generate the calendar displays of FIGS. 8, 9a, and 9b, as well as the shadowed calendar displays of FIGS. 11, 12, 13, and 14. The instant message program 702 may utilize any messaging protocol and technology known in the art, such as the technology and protocol used in the Lotus Development Corporation's Sametime product line**, ICQ, American Online (AOL) Corporation's Instant Messenger, etc. In certain implementations, both the instant messenger program 702 and calendar program 704 receive shadowed scheduled event records 502 (FIG. 16) from users being shadowed. These shadowed scheduled event records 500 originate from shadowed users whose tracker list 500 (FIG. 15) includes the unique identifier of the tracking user receiving the shadowed scheduled event records 500.

**Bluetooth is a trademark of Telefonaktiebolaget LM Ericsson; Sametime and Lotus are trademarks of Lotus Development Corp. and/or International Business Machines, Corp.

Within the PIM client 700, received shadowed scheduled event records 500 are routed to the instant messenger program 702 and the calendar program 704. The instant messenger program 702 maintains two buffers 706 and 708 of information on shadowed users in the wireless device 2 memory (not shown). An activity log buffer 706 provides a list of information on shadowed users received for an extended period of time. In certain implementations, the activity log buffer 706 may buffer information on shadowed users in a Last-In-First-Out (LIFO) basis, such that the oldest entries of information on shadowed users are deleted from the activity log buffer 706 if space for newer entries is needed. A current activity buffer 708 provides a list of recently received information on shadowed users.

The calendar program 704 maintains calendar data 710 that is used to generate the calendar information, including information on the wireless device 2 user as well as shadowed users, in the calendar displays as described above. The calendar information in the calendar data 710 may be gleaned from calendar data received from the PIM server 24 in the form of scheduled event records 52 (FIG. 3a), filtered position records (FIG. 3d), and shadowed scheduled event records 502 (FIG. 16).

Figure 22:
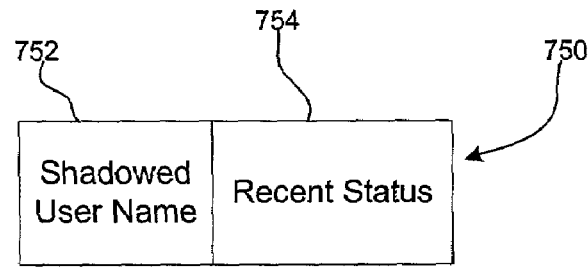
FIG. 22 illustrates information fields included in a shadowed user entry in accordance with implementations of the present invention.

FIG. 22 illustrates a shadowed user entry 750 that the instant messenger 702 maintains in the activity log buffer 706 and current activity buffer 708, which includes information on a shadowed user's activity. Each shadowed user entry 750 includes a name 752 of the shadowed user and recent status information 754, such as the current location of the shadowed user, a new scheduled event, modifications to a scheduled event record in the shadowed user records 50, etc. In one implementation, the instant messenger 702 may generate shadowed user entries 750 from the received shadowed scheduled event record 502. Alternatively, the PIM server 4 may generate shadowed user entries 750 to provide to the PIM client 700 when performing PIM database 22 operations.

Figure 23:
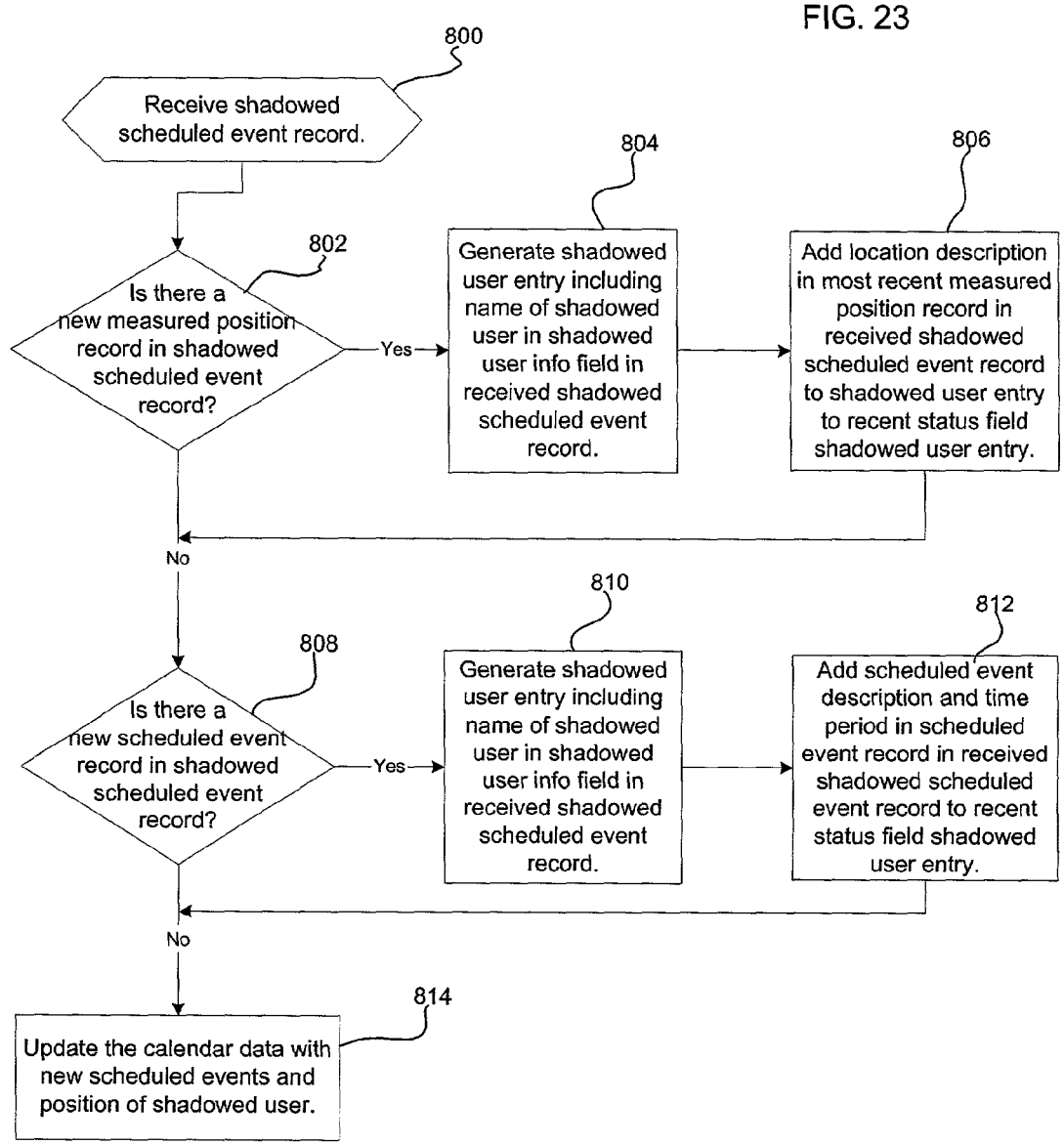
FIG. 23 illustrates logic to generate shadowed user entries in accordance with implementations of the present invention.

FIG. 23 illustrates logic implemented in the instant messenger 702 to generate shadowed user entries 750. In the implementation of FIG. 23, the instant messenger 702 generates shadowed user entries 750 from shadowed scheduled event records 502 (FIG. 16) that are also provided to the calendar program 704 to render in the calendar displays. The PIM server 24 may transmit a shadowed scheduled event record 502 whenever one is generated or may gather shadowed scheduled event records 502 for a tracker user for a period of time, and then transmit a group of shadowed scheduled event records 502 for one or more shadowed users to the tracker user. With respect to FIG. 23, control begins at block 800 when the instant messenger 702 receives a scheduled event record 502 from the PIM server 24. The instant messenger 702 determines (at block 802) whether there is a new measured position record 54 (FIG. 3b) in the most recent measured position field 508 in the shadowed scheduled event record 502 (FIG. 16). In implementations where the shadowed scheduled event record 502 includes only recent modifications to the shadowed user records 50 (FIG. 2), then if the field 508 (FIG. 16) includes a measured position record 54 (FIG. 3b), then such record 54 is a newly generated measured position record 54 that includes new position information for the shadowed user. In implementations where the shadowed scheduled event record 502 includes cumulative information, then the instant messenger 702 may determine whether the measured position record 54 in the most recent field 508 is in fact a new measured position by determining whether the measured position is different from measured position information in the most recently generated shadowed user entry 750 in the activity log buffer 706. If the most recent field 508 includes new position information, then the instant messenger 702 generates (at block 804) a shadowed user entry 750 (FIG. 21) and adds the name of the shadowed user in the shadowed user info field 506 of the shadowed scheduled event record 502 to the shadowed user name field 752 in the shadowed user entry 750 (FIG. 21). The location description 86 (FIG. 3b) in the measured position record 54 in the field 508 of the shadowed scheduled event record 502 (FIG. 16) is then added (at block 806) to the recent status field 754 in the shadowed user entry 750 being generated.

From block 802 or 806, the instant messenger 702 determines (at block 808) whether the received shadowed scheduled event record 502 includes a new scheduled event record 52. As mentioned, if the shadowed scheduled event record 502 includes only new changes to the user records 50 of the shadowed user, then the scheduled event records 510a . . . 510n (FIG. 16) in the received shadowed scheduled event record 502 would only include new, recently added scheduled event records 502. Alternatively, if the received shadowed scheduled event record 502 includes cumulative information, then the scheduled event records 510a . . . 510a . . . 510n may include both old and new scheduled event records 50. In such case, the instant messenger 702 would determine whether any of the scheduled event records 510a . . . 510a . . . 510n included in the received record 502 are in fact new by determining whether the event description 74 (FIG. 3a) in the received scheduled event records 510a . . . . 510n differs from event descriptions maintained in the recent status field 754 of any shadowed user entries and/or event descriptions for shadowed users maintained in the calendar data 710. In the event that the received shadowed scheduled event record 502 includes new scheduled event records 510a . . . 510a . . . 510m not previously received, then the instant messenger 702 generates (at block 810) a shadowed user entry 750 (FIG. 21) and adds the name of the shadowed user in the shadowed user info field 506 of the shadowed scheduled event record 502 to the shadowed user name field 752 in the generated shadowed user entry 750 (FIG. 21). The scheduled event description 74 (FIG. 3a) and time period 72 of the scheduled event in the new scheduled event record 510a . . . 510n (FIG. 16) are then added (at block 812) to the recent status field 754 in the shadowed user entry 750 being generated. The calendar data 710 is then updated (at block 814) with the new scheduled event records and position information in the added shadowed user entry 750. A shadowed user entry 750 may be generated for each new shadowed scheduled event record 510a . . . 510n in the received shadowed scheduled event record 502.

Figure 24:
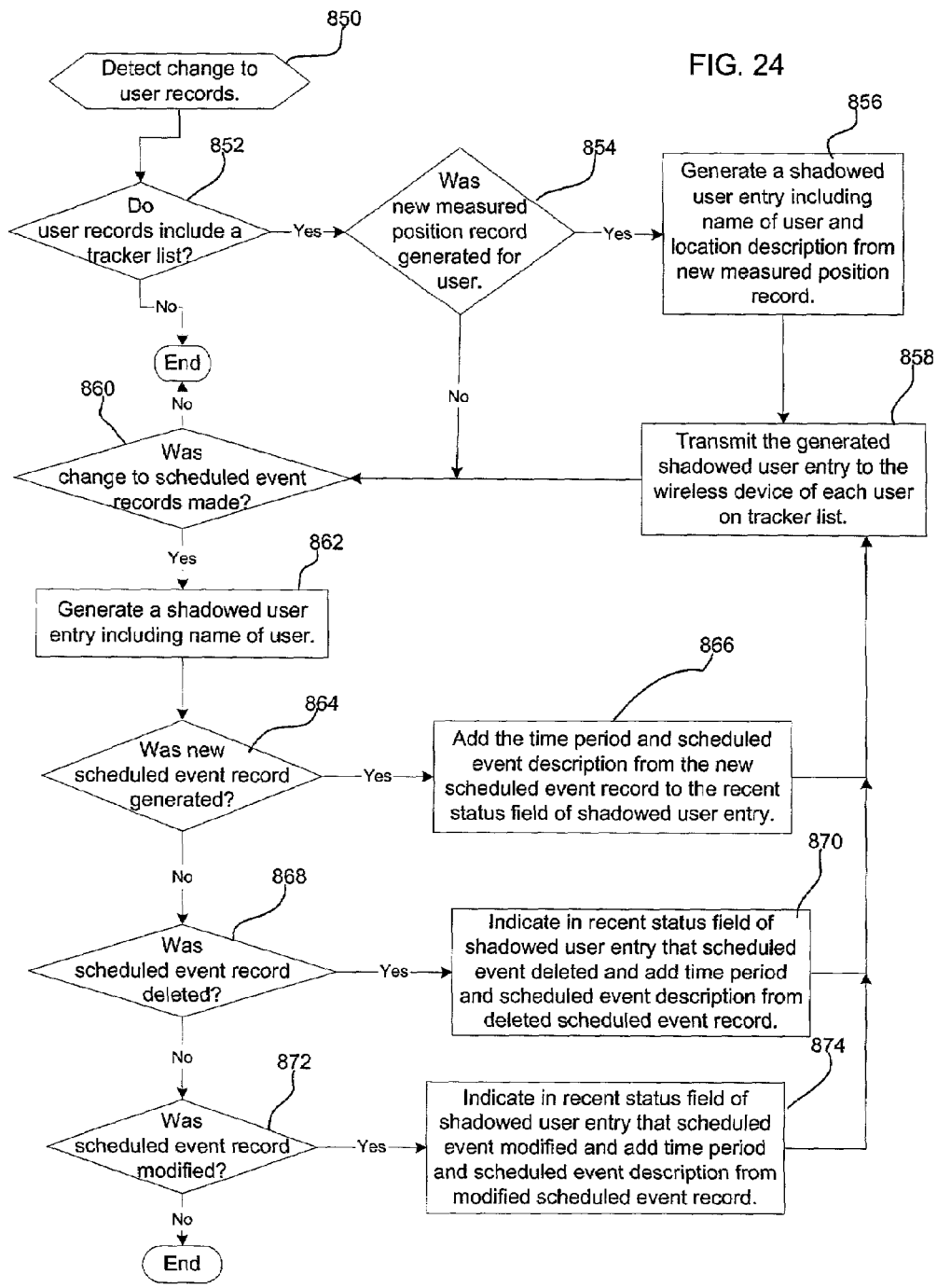
FIG. 24 illustrates logic to generate shadowed user entries in accordance with additional implementations of the present invention.

FIG. 24 illustrates an alternative implementation where shadowed user entries 750 (FIG. 21) are generated by the PIM server 24 and then transmitted to the wireless device 2 and PIM client 700. Control begins at block 850 with the PIM server 24 detecting a change to the user records 50 (FIG. 2) for one user. If (at block 852) the user records 50 include a tracker list 500 (FIG. 15), then the PIM server 24 determines (at block 854) whether the change involved a new measured position record 54 (FIG. 3b) being generated. If so, then the PIM server 24 generates (at block 856) a shadowed user entry 750 including the name of the user in the shadowed user name field 752 and the location description 86 from the new measured position record 54 (FIG. 3b) in the recent status field 754. In certain implementations, a shadowed user entry 750 is only generated for a measured position record 54 that is at a position coordinate 84 within a different geographical location than the position coordinate from the previous generated measured position record 54 (FIG. 3b). This would avoid sending shadowed user entries having redundant geographical locations for the shadowed user to the tracker user. The PIM server 24 then transmits (at block 858) the generated shadowed user entry 750 to the wireless device 2 of each user on the tracker list 500 (FIG. 15). If (at block 852) the user records 50 do not include a tracker list 500, then control ends.

From the no branch of 854 or 858, the PIM server 24 determines (at block 860) whether a change was made to the scheduled event records 52 in the user records 50 (FIG. 2). If so, a shadowed user entry 750 is generated (at block 862) to include the name of the user whose records 50 were changed in the shadowed user name field 752. If (at block 864) a new scheduled event record 54 was generated, then the PIM server 24 adds (at block 866) the time period 72 and scheduled event description 74 to the recent status field 754 of the shadowed user entry 750 being generated. If (at block 868) a scheduled event record 54 was deleted from the user records 50, then the PIM server 24 indicates (at block 870) in the recent status field 754 of the generated shadowed user entry 750 that a scheduled event record 52 was deleted and the time period 72 and scheduled event description 74 of the deleted scheduled event record 52. If (at block 872) a scheduled event record 54 was modified in the user records 50, then the PIM server 24 indicates (at block 874) in the recent status field 754 of the generated shadowed user entry 750 that a scheduled event record 52 was modified and the time period 72 and scheduled event description 74 of the deleted scheduled event record 52. From blocks 866, 870, and 874, control proceeds to block 858 to transmit the generated shadowed user entry 750 to the wireless device 2 of each user in the tracker list 500 (FIG. 15).

Figure 25:
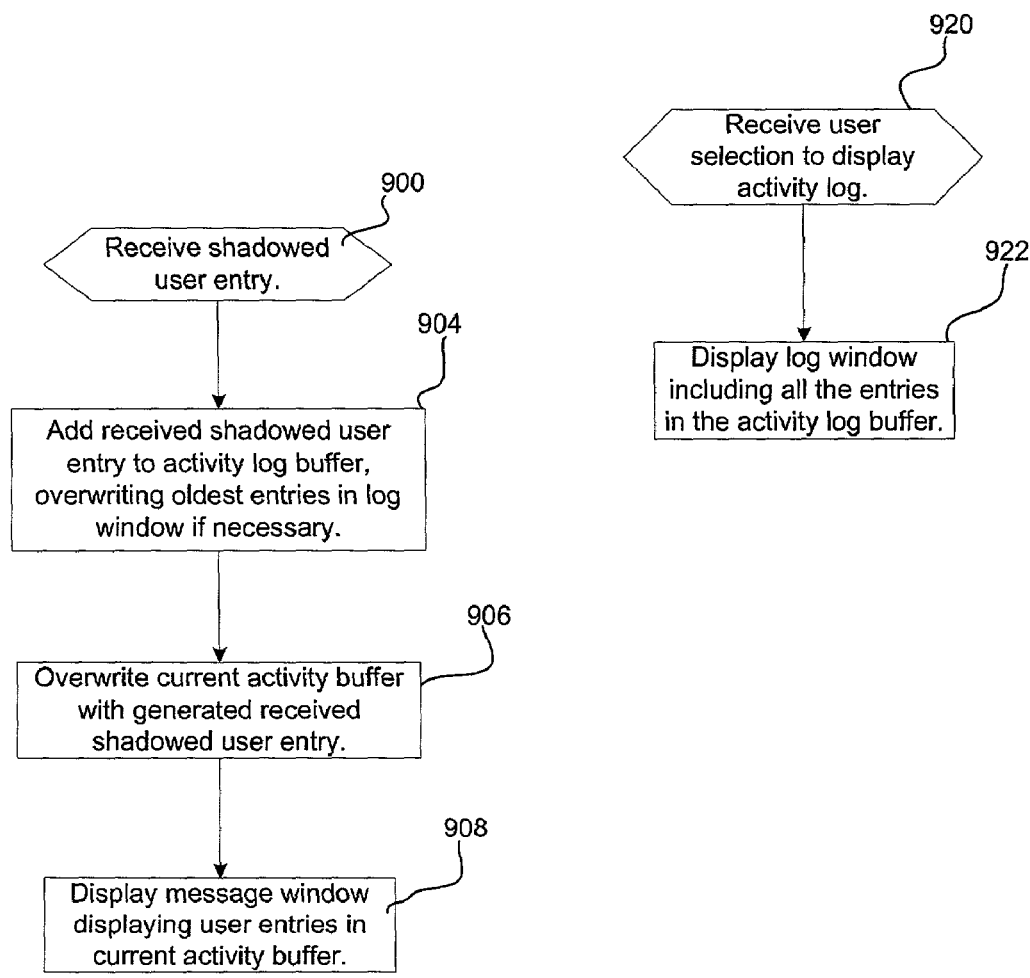
FIG. 25 illustrates logic to render information from shadowed user entries in accordance with implementations of the present invention.

FIG. 25 illustrates logic implemented in the instant messenger 702 to process shadowed user entries 750 generated according to the logic of FIGS. 23 or 24. Control begins at block 900 when the instant messenger 702 receives a shadowed user entry 750. The received shadowed user entry 750 is added (at block 904) to the activity log buffer 706. If the activity log buffer 706 is full, the new received user entry 750 would overwrite the oldest entry in the activity log buffer 706. For instance, the activity log buffer 706 may comprise a circular queue. The contents of the current activity buffer 708 are overwritten (at block 906) with the received shadowed user entry 750. Alternatively, the current activity buffer 708 may comprise a few entries, such that the current activity buffer 708 may include multiple entries. The instant messenger 702 then displays the content of the current activity buffer 708 in a message window.

FIG. 26 illustrates a current shadowed activity window 950 the instant messenger 702 renders on the display 18 (FIG. 1) including information on the shadowed user entries in the current activity buffer 708. The displayed information includes the name of the shadowed user and description of the event triggering the shadowed entry, i.e., new position information or changes to the scheduled event records 52. In certain implementations the current shadowed activity window 950 displays a log button 952 or other graphical element to cause the display of the shadowed user entries in the activity log buffer 706.

FIG. 26 further illustrates a shadowed log activity window 960 capable of displaying more shadowed user entries than displayed in the current shadowed activity window 950. As mentioned, the activity log buffer 706 provides more shadowed user entries than the current activity buffer 708, which provides only the most recently received shadowed user entries. A current status 962 button or other graphical element may be selected to cause the instant messenger 702 to display the current shadowed activity window 950. Both windows 950 and 960 display a scroll bar to allow a user to scroll through shadowed user entries in the windows 950 and 960.

In additional implementations, the message windows 950 and 960 may enable the user of the wireless device 2 to communicate directly with the shadowed user. For instance, the names of the shadowed users in the displays 950 and 960 may be displayed as hypertext links, where selection of the shadowed user entry displays the communication window 600 (FIG. 19) to enable communication with the shadowed user. Additionally, selection of some other displayed graphical element or input mechanism on the wireless device 2 could enable communication with the shadowed user.

The shadowed user may comprise a person or an entity. In the case where the shadowed user is an entity, the shadowed user entries may provide information on events, products, offerings, etc. provided by the shadowed entity. Further, the communication window 600 to enable communication with an entity whose events are displayed in the message windows 950 and 960 may enable making a reservation for an event offered by the scheduled entity, purchasing a product or service, etc. Still further, when the shadowed user entry includes information on a scheduled event, such as a modified, added or deleted scheduled event to the shadowed user's records, then the communication enabled with a shadowed user whose scheduled event is displayed in the message windows 950 and 960 may constitute acceptance of the added or modified scheduled event.

Additional Implementation Details

The described aspects of the invention, including the logic described with respect to the PIM client and server and any other devices, may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which the invention is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the wireless device obtains the position coordinates and time and date information and transmits the data to the server 4. In alternative implementations, telecommunication devices or towers can detect the location of the wireless device and transmit the data for the measured position record 54 directly to the server 4. In such implementations, the wireless device would not be involved in transmitting position coordinates for the measured position records.

The described implementations concerned maintaining user location information with a user calendar program. The described implementations can further be used to provide and utilize a persons geographic location and/or activities for a measured time period for any purpose, not just calendering. For instance, a company may want to track the location and activity of workers. The company can then filter and compare a workers actual location/activity with their work schedule. Such information would be particularly useful for manufacturers and others attempting to determine optimal human resource allocation in the workplace.

The PIM location/activity information of the described implementations would also be very useful for companies that have to send workers out to field locations, such as cable companies, telephone companies, plumbers, etc., to track how the worker's actual location/activities correspond to those scheduled. In the case that real time worker location/activity information is provided to the calendar display, then the company can track the workers schedule and their actual geographic location in real time. Moreover, because descriptive geographic information is provided, a quick review of the calendar information can provide useful information on the workers geographic location, such as their presence in a particular building. Moreover, to the extent location records define the geographic boundaries of major roadways and freeways, a manager could review a field workers real time calendar, which could display that the worker is presently driving on a roadway. The activity algorithm can specify the rate the worker is traveling, i.e., indicating stuck in traffic, etc.

In the described implementations, scheduled events and location/activity information were displayed together in a user calendar view. Alternatively, the calendar view may selectively display only scheduled events or location/activity information.

The described implementations presented the scheduled event and location/activity information at different times during a user specified time interval. However, the generated location/activity information may be presented in alternative formats. For instance, the user may generate a display of all locations visited and activities, and the time period during which the location was visited or activity performed would be displayed under the location/activity display.

FIGS. 3a, b, c, d illustrate one implementation of the data structures used to maintain the information used in the described implementations. However, those skilled in the art will recognize that the there are numerous ways the data shown in FIGS. 3a, b, c, d may be organized in data structures and a database for storage and retrieval.

In the described implementations, the PIM server 24 transmitted the PIM information to the client PIM 20 or some other client to display in a browser, such as a WML or HTML browser. In alternative implementations, the PIM server 24 may provide the generated PIM information in alternative presentation and file formats, or alternative text markup languages than those described herein. Moreover, the location information presented to the user through the browser may present information in alternative presentation formats, such as audio, movies, etc. For instance, the calendar may display a hypertext description of the visited location. User selection of the hypertext description could present a movie or audio file about the visited location.

Still further, the user, through the wireless device 2 or some other computer may provide images or audio files taken from a location to associate with measured position records. In certain implementations, the wireless device 2 could include a microphone, still image camera, video camera etc. The user could then associate such multi-media files image information with the location that the PIM client 20 would provide with the measured position records 54 sent to the PIM server 24. This information would be made available to those viewing the calendar providing the location/activity information.

In the described implementation, the generated location was expressed as an x, y, z position coordinate. However, as discussed, the position coordinate may be expressed as any set of numbers used in specifying a location in space, or may comprise a code or descriptor defining a location in space.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing information on users of wireless devices in a database to a personal information manager of one user wireless device, comprising:

maintaining records for users of wireless devices within the database;

for at least one shadowed user, maintaining in the database a list of other users tracking the shadowed user;

generating position records indicating a geographical location of wireless devices associated with users of the database and a time the geographical location was determined;

determining, for shadowed users, whether a modification was made to one database record for the shadowed user;

determining whether a new position record was generated indicating a geographical location and time the geographical location was determined for the wireless device associated with the shadowed user;

for each user on the list of each shadowed user, transmitting information to the wireless device of the user on the list indicating the shadowed user, the determined modification made with respect to the database record of the shadowed user, and geographical location and time in the new position record.

2. The method of claim 1, wherein determining whether one database record for the shadowed user was modified further comprises determining whether one scheduled event record for the shadowed user was modified, and wherein the transmitted information further indicates modifications made to the scheduled event record of the shadowed user.

3. The method of claim 2, wherein the information on the determined modification further indicates whether the modified scheduled event record was added, modified or deleted from the shadowed user's scheduled event records in the database.

4. The method of claim 3, wherein the information on the determined modification further indicates a description of the modified scheduled event record.

5. The method of claim 2, wherein the transmitted information indicating the shadowed user and the modification to one shadowed user scheduled event record is further capable of being displayed in a calendar view at the wireless device.

6. The method of claim 1, wherein determining whether a new position record was generated further comprises determining whether the geographical location of the wireless device of the shadowed user is different from the geographical location in a previously generated position record for the shadowed user, wherein the transmitted information indicates a geographical location different from the geographical location indicated in previously transmitted information on the shadowed user.

7. The method of claim 1, wherein the shadowed users include an individual and wherein the database records for the individual shadowed user comprise personal information for the individual.

8. The method of claim 1, wherein the shadowed users include an entity and wherein the database records provide information on an offering made by the entity shadowed user.

9. The method of claim 1, wherein the information is transmitted according to an instant messaging protocol.

10. A method for rendering information transmitted from a database in a remote server in a personal information manager executing in a wireless device, wherein records are maintained in the database for users of wireless devices, comprising:

receiving information transmitted from the remote server indicating a modification to one of the database records for one shadowed user of one other wireless device and information on a geographical location and time the geographical location was determined for a wireless device associated with the shadowed user;

displaying a message window on the wireless device in response to receiving the transmitted information;

rendering the received information in the message window; and rendering a calendar view in the wireless device to display calendar information maintained for the user of the wireless device in the database, wherein the calendar view displays information on the shadowed user.

11. The method of claim 10, further comprising:

receiving information transmitted from the remote server indicating modifications to database records for additional shadowed users; and rendering the received information for multiple shadowed users in the message window.

12. The method of claim 11, further comprising:

displaying a log window; and rendering in the log window the received information from the remote server including information on multiple modifications to the database records for one shadowed user.

13. The method of claim 10, wherein the received and rendered information includes information on modifications made to one scheduled event record for the shadowed user.

14. The method of claim 13, wherein the received and rendered information on the modification further indicates whether the modified scheduled event record was added, modified or deleted from the shadowed user's scheduled event records in the database.

15. The method of claim 14, wherein the received and rendered information on the modification further indicates a description of the modified scheduled event record.

16. A method for rendering information transmitted from a database in a remote server in a personal information manager executing in a wireless device, wherein records are maintained in the database for users of wireless devices, comprising:

receiving information transmitted from the remote server indicating a modification to one scheduled event record of the database records for one shadowed user of one other wireless device;

displaying a message window on the wireless device in response to receiving the transmitted information;

rendering the received information in the message window; and rendering a calendar view in the wireless device to display calendar information maintained for the user of the wireless device in the database and information for scheduled events for the user of the wireless device and for the shadowed user in a manner such that a conflict signal is generated if scheduled event records for the user of the wireless device are scheduled for overlapping calendar times, and wherein the conflict signal is not generated if one scheduled event record for the shadowed user and for the user of the wireless device are scheduled for overlapping calendar times.

17. The method of claim 10, wherein the received and rendered geographical location information is different from previously received and rendered geographical location information for the other wireless device of the shadowed user.

18. The method of claim 10, further comprising:

rendering in the calendar view information rendered in the message window.

19. The method of claim 10, further comprising:
receiving selection of one shadowed user for which information is rendered in the message window; and
displaying information at the wireless device enabling communication with the selected shadowed user.

20. The method of claim 10, wherein the shadowed users include entities and individuals.

21. A system for providing information to a personal information manager of one user wireless device, comprising:
a computer readable medium;
a database included in the computer readable medium including records of users of wireless devices;
means for maintaining in the database, for at least one shadowed user, a list of other users tracking the shadowed user;
means for generating position records indicating a geographical location of wireless devices associated with users of the database and a time the geographical location was determined;
means for determining, for shadowed users, whether a modification was made to one database record for the shadowed user;
means for determining whether a new position record was generated indicating a geographical location and time the geographical location was determined for the wireless device associated with the shadowed user; and
means for transmitting, for each user on the list of each shadowed user, information to the wireless device of the user on the list indicating the shadowed user, the determined modification made with respect to the database record of the shadowed user, and the geographical location and time in the new position record.

22. The system of claim 21, wherein the means for determining whether one database record for the shadowed user was modified determines whether one scheduled event record for the shadowed user was modified, and wherein the transmitted information further indicates modifications made to the scheduled event record of the shadowed user.

23. The system of claim 22, wherein the information on the determined modification further indicates whether the modified scheduled event record was added, modified or deleted from the shadowed user's scheduled event records in the database.

24. A wireless device for rendering information transmitted from a database in a remote server, wherein records are maintained in the database for users of wireless devices, comprising:
means for receiving information transmitted from the remote server indicating a modification to one of the database records for one shadowed user of one other wireless device and information on a geographical location and time the geographical location was determined for a wireless device associated with the shadowed user;
means for displaying a message window on the wireless device in response to receiving the transmitted information;
means for rendering the received information in the message window; and
means for rendering a calendar view in the wireless device to display calendar information maintained for the user of the wireless device in the database, wherein the calendar view displays information on the shadowed user.

25. The system of claim 24, further comprising:
means for receiving information transmitted from the remote server indicating modifications to database records for additional shadowed users; and
means for rendering the received information for multiple shadowed users in the message window.

26. The system of claim 24, wherein the received and rendered information includes information on modifications made to one scheduled event record for the shadowed user.

27. The system of claim 26, wherein the received and rendered information on the modification further indicates whether the modified scheduled event record was added, modified or deleted from the shadowed user's scheduled event records in the database.

28. A wireless device for rendering information transmitted from a database in a remote server, wherein records are maintained in the database for users of wireless devices, comprising:
means for receiving information transmitted from the remote server indicating a modification to one scheduled event record of the database records for one shadowed user of one other wireless device;
means for displaying a message window on the wireless device in response to receiving the transmitted information;
means for rendering the received information in the message window; and
means for rendering a calendar view in the wireless device to display information means for rendering a calendar view in the wireless device to display information for scheduled events for the user of the wireless device and for the shadowed user in a manner such that a conflict signal is generated if scheduled event records for the user of the wireless device are scheduled for overlapping calendar times, and wherein the conflict signal is not generated if one scheduled event record for the shadowed user and for the user of the wireless device are scheduled for overlapping calendar times.

29. The system of claim 24, further comprising:
means for receiving selection of one shadowed user for which information is rendered in the message window; and
means for displaying information at the wireless device enabling communication with the selected shadowed user.

30. An article of manufacture including code for providing information on users of wireless devices in a database to a personal information manager of one user wireless device, wherein the code causes operations to be performed comprising:
maintaining records for users of wireless devices within the database;
for at least one shadowed user, maintaining in the database a list of other users tracking the shadowed user;
generating position records indicating a geographical location of wireless devices associated with users of the database and a time the geographical location was determined,
determining, for each shadowed user, whether a modification was made to one database record for the shadowed user; and
determining whether a new position record was generated indicating a geographical location and time the geographical location was determined for the wireless device associated with the shadowed user; and
for each user on the list of each shadowed user, transmitting information to the wireless device of the user on the list indicating the shadowed user, the determined modification made with respect to the database record of the shadowed user, and the geographical location and time in the new position record.

31. The article of manufacture of claim 30, wherein determining whether one database record for the shadowed user was modified further comprises determining whether one scheduled event record for the shadowed user was modified, and wherein the transmitted information further indicates modifications made to the scheduled event record of the shadowed user.

32. The article of manufacture of claim 31, wherein the information on the determined modification further indicates whether the modified scheduled event record was added, modified or deleted from the shadowed user's scheduled event records in the database.

33. The article of manufacture of claim 32, wherein the information on the determined modification further indicates a description of the modified scheduled event record.

34. The article of manufacture of claim 31, wherein the transmitted information indicating the shadowed user and the modification to one shadowed user scheduled event record is further capable of being displayed in a calendar view at the wireless device.

35. The article of manufacture of claim 30, wherein determining whether a new position record was generated further comprises determining whether the geographical location of the wireless device of the shadowed user is different from the geographical location in a previously generated position record for the shadowed user, wherein the transmitted information indicates a geographical location different from the geographical location indicated in previously transmitted information on the shadowed user.

36. The article of manufacture of claim 30, wherein the shadowed users include an individual and wherein the database records for the individual shadowed user comprise personal information for the individual.

37. The article of manufacture of claim 30, wherein the shadowed users include an entity and wherein the database records provide information on an offering made by the entity shadowed user.

38. The article of manufacture of claim 30, wherein the information is transmitted according to an instant messaging protocol.

39. An article of manufacture including code for rendering information transmitted from a database in a remote server in a personal information manager executing in a wireless device, wherein records are maintained in the database for users of wireless devices, and wherein the code causes operations to be performed comprising:
    receiving information transmitted from the remote server indicating a modification to one of the database records for one shadowed user of one other wireless device and information on a geographical location and time the geographical location was determined for a wireless device associated with the shadowed user;
    displaying a message window on the wireless device in response to receiving the transmitted information;
    rendering the received information in the message window; and
    rendering a calendar view in the wireless device to display calendar information maintained for the user of the wireless device in the database, wherein the calendar view displays information on the shadowed user.

40. The article of manufacture of claim 38, further comprising:
    receiving information transmitted from the remote server indicating modifications to database records for additional shadowed users; and
    rendering the received information for multiple shadowed users in the message window.

41. The article of manufacture of claim 40, further comprising:
    displaying a log window; and
    rendering in the log window the received information from the remote server including information on multiple modifications to the database records for one shadowed user.

42. The article of manufacture of claim 38, wherein the received and rendered information includes information on modifications made to one scheduled event record for the shadowed user.

43. The article of manufacture of claim 42, wherein the received and rendered information on the modification further indicates whether the modified scheduled event record was added, modified or deleted from the shadowed user's scheduled event records in the database.

44. The article of manufacture of claim 43, wherein the received and rendered information on the modification further indicates a description of the modified scheduled event record.

45. An article of manufacture including code for rendering information transmitted from a database in a remote sewer in a personal information manager executing in a wireless device, wherein records are maintained in the database for users of wireless devices, and wherein the code causes operations to be performed comprising:
    receiving information transmitted from the remote sewer indicating a modification to one scheduled event record of the database records for one shadowed user of one other wireless device;
    displaying a message window on the wireless device in response to receiving the transmitted information;
    rendering the received information in the message window; and
    rendering a calendar view in the wireless device to display information for scheduled events for the user of the wireless device and for the shadowed user in a manner such that a conflict signal is generated if scheduled event records for the user of the wireless device are scheduled for overlapping calendar times, and wherein the conflict signal is not generated if one scheduled event record for the shadowed user and for the user of the wireless device are scheduled for overlapping calendar times.

46. The article of manufacture of claim 39, wherein the received and rendered geographical location information is different from previously received and rendered geographical location information for the other wireless device of the shadowed user.

47. The article of manufacture of claim 39, further comprising:
    rendering in the calendar view information rendered in the message window.

48. The article of manufacture of claim 39, further comprising:
    receiving selection of one shadowed user for which information is rendered in the message window; and
    displaying information at the wireless device enabling communication with the selected shadowed user.

49. The article of manufacture of claim 39, wherein the shadowed users include entities and individuals.

* * * * *